US010012480B2

(12) United States Patent
Wibby et al.

(10) Patent No.: US 10,012,480 B2
(45) Date of Patent: Jul. 3, 2018

(54) BALLISTIC RESISTANT PANEL FOR VEHICLE DOOR

(71) Applicant: ANGEL ARMOR, LLC, Fort Collins, CO (US)

(72) Inventors: Adam L. Wibby, Fort Collins, CO (US); Alan V. Morine, Fort Collins, CO (US); Eric B. Strauss, Fort Collins, CO (US)

(73) Assignee: Angel Armor, LLC, Fort Collins, CO (US)

( * ) Notice: Subject to any disclaimer, the term of this patent is extended or adjusted under 35 U.S.C. 154(b) by 0 days.

(21) Appl. No.: 14/727,788

(22) Filed: Jun. 1, 2015

(65) Prior Publication Data

US 2015/0260483 A1  Sep. 17, 2015

Related U.S. Application Data

(63) Continuation-in-part of application No. 14/322,931, filed on Jul. 3, 2014.
(Continued)

(51) Int. Cl.
*F41H 5/04* (2006.01)
*F41H 7/04* (2006.01)
(Continued)

(52) U.S. Cl.
CPC ............ *F41H 5/0478* (2013.01); *B32B 5/12* (2013.01); *B32B 5/26* (2013.01); *B32B 7/12* (2013.01);
(Continued)

(58) Field of Classification Search
CPC ...... F41H 5/0478; F41H 5/0485; F41H 7/044; Y10T 29/49716
(Continued)

(56) References Cited

U.S. PATENT DOCUMENTS

| 3,557,384 A | 1/1971 | Barron et al. |
| 4,090,005 A * | 5/1978 | Morgan ................... B32B 5/26 428/213 |

(Continued)

FOREIGN PATENT DOCUMENTS

| WO | 2009/121902 | 10/2009 |
| WO | 2010/073966 | 7/2010 |

(Continued)

OTHER PUBLICATIONS

U.S. Appl. No. 61/461,586, filed Jan. 19, 2011.
(Continued)

*Primary Examiner* — Vincent A Tatesure
(74) *Attorney, Agent, or Firm* — Craig R. Miles; CR MILES P.C.

(57) ABSTRACT

A ballistic resistant panel can be configured to be quickly and easily installed in a vehicle door. The ballistic resistant panel can include a plurality of ballistic sheets arranged in a stack. The stack can have an outer perimeter sized to fit within a cavity of the vehicle door. The panel can include a cover disposed over the stack, and the cover can be sealed around a perimeter of the stack to form a waterproof barrier that prevents moisture from reaching and altering the performance of the ballistic sheets. At least one anti-wear strip can be adhered to an outer surface of the cover. The anti-wear strip can provide a low friction surface that protects the panel from damage caused by moving internal door components, such as moving window components that repeatedly rub against the panel.

16 Claims, 14 Drawing Sheets

Related U.S. Application Data

(60) Provisional application No. 62/006,255, filed on Jun. 1, 2014, provisional application No. 61/903,337, filed on Nov. 12, 2013, provisional application No. 61/842,937, filed on Jul. 3, 2013.

(51) Int. Cl.

| | | |
|---|---|---|
| *B32B 37/10* | (2006.01) | |
| *B32B 5/12* | (2006.01) | |
| *B32B 5/26* | (2006.01) | |
| *B32B 7/12* | (2006.01) | |
| *B32B 25/10* | (2006.01) | |
| *B32B 27/12* | (2006.01) | |
| *B32B 27/28* | (2006.01) | |
| *B32B 27/30* | (2006.01) | |
| *B32B 27/32* | (2006.01) | |
| *B32B 27/40* | (2006.01) | |
| *B32B 38/18* | (2006.01) | |

(52) U.S. Cl.
CPC .............. *B32B 25/10* (2013.01); *B32B 27/12* (2013.01); *B32B 27/283* (2013.01); *B32B 27/304* (2013.01); *B32B 27/32* (2013.01); *B32B 27/40* (2013.01); *B32B 37/1018* (2013.01); *F41H 5/0485* (2013.01); *F41H 7/044* (2013.01); *B32B 38/1866* (2013.01); *B32B 2255/02* (2013.01); *B32B 2255/26* (2013.01); *B32B 2260/023* (2013.01); *B32B 2260/046* (2013.01); *B32B 2262/0253* (2013.01); *B32B 2262/0269* (2013.01); *B32B 2262/04* (2013.01); *B32B 2307/712* (2013.01); *B32B 2307/7265* (2013.01); *B32B 2309/02* (2013.01); *B32B 2309/04* (2013.01); *B32B 2323/04* (2013.01); *B32B 2323/10* (2013.01); *B32B 2571/02* (2013.01); *B32B 2605/00* (2013.01); *Y10T 29/49716* (2015.01)

(58) Field of Classification Search
USPC .............................. 89/36.08, 36.02; 442/135
See application file for complete search history.

(56) References Cited

U.S. PATENT DOCUMENTS

| | | |
|---|---|---|
| 4,287,607 A | 9/1981 | Leach |
| 4,352,316 A | 10/1982 | Medlin |
| 4,457,985 A | 7/1984 | Harpell et al. |
| 4,522,871 A | 6/1985 | Armellino et al. |
| 4,650,710 A | 3/1987 | Harpell et al. |
| 5,180,880 A | 1/1993 | Zufle |
| 5,187,003 A | 2/1993 | Chitrangad |
| 5,190,802 A | 3/1993 | Pilato |
| 5,437,905 A | 8/1995 | Park |
| 5,444,898 A | 8/1995 | Norvell |
| 5,471,906 A | 12/1995 | Bachner, Jr. et al. |
| 5,547,536 A | 8/1996 | Park |
| 5,560,971 A | 10/1996 | Emery |
| 5,723,388 A | 3/1998 | Kobayashi et al. |
| 5,789,327 A | 8/1998 | Rousseau |
| 5,883,357 A | 3/1999 | Newman et al. |
| 5,926,842 A | 7/1999 | Price et al. |
| 6,026,509 A | 2/2000 | Bachner, Jr. |
| 6,151,710 A | 11/2000 | Bachner |
| 6,286,499 B1 | 9/2001 | Yoshii et al. |
| 6,327,954 B1 | 12/2001 | Medlin |
| 6,389,594 B1 | 5/2002 | Yavin |
| 6,620,471 B1 | 9/2003 | Do |
| 6,651,543 B2 | 11/2003 | Park |
| 7,231,857 B2 | 6/2007 | Hill et al. |
| 7,251,835 B2 | 8/2007 | Learmont |
| 7,598,185 B2 | 10/2009 | Pilpel et al. |
| 7,642,206 B1 | 1/2010 | Bhatnagar et al. |
| 7,766,641 B2 | 8/2010 | Silverbrook |
| 7,923,094 B1 | 4/2011 | Harding et al. |
| 7,972,679 B1 | 7/2011 | Lyons et al. |
| 8,124,548 B2 | 2/2012 | Ardiff et al. |
| 8,298,969 B2 | 10/2012 | Bahukudumbi |
| 8,443,706 B2 | 5/2013 | Egres |
| 8,475,620 B2 | 7/2013 | Matsuoka et al. |
| 8,697,220 B2 | 4/2014 | Tam et al. |
| 2003/0104739 A1 | 6/2003 | Jenkins et al. |
| 2003/0213399 A1 | 11/2003 | Norton et al. |
| 2005/0067816 A1 | 3/2005 | Buckman |
| 2006/0181102 A1* | 8/2006 | Lemieux ............. B60R 13/0243 296/37.13 |
| 2007/0062595 A1 | 3/2007 | Bhatnagar et al. |
| 2007/0089596 A1 | 4/2007 | Huber et al. |
| 2007/0125223 A1 | 6/2007 | Heidenreich et al. |
| 2007/0238379 A1 | 10/2007 | Bhatnagar et al. |
| 2007/0293107 A1 | 12/2007 | Follo et al. |
| 2008/0012169 A1 | 1/2008 | Solomon et al. |
| 2008/0098896 A1 | 5/2008 | Cheng |
| 2008/0129084 A1* | 6/2008 | Blackmer ............... F41H 5/013 296/152 |
| 2008/0138566 A1 | 6/2008 | Stewart et al. |
| 2008/0238083 A1 | 10/2008 | Warford |
| 2009/0068453 A1 | 3/2009 | Chung |
| 2009/0126557 A1 | 5/2009 | Hunn |
| 2009/0282596 A1 | 11/2009 | Carbajal et al. |
| 2010/0005556 A1 | 1/2010 | Pittman et al. |
| 2010/0170386 A1 | 7/2010 | Bhatnagar et al. |
| 2010/0326336 A1 | 12/2010 | Struthers et al. |
| 2011/0005382 A1 | 1/2011 | Farquhar et al. |
| 2011/0017056 A1 | 1/2011 | Chu et al. |
| 2011/0041676 A1 | 2/2011 | Park et al. |
| 2011/0061522 A1 | 3/2011 | Jarrett |
| 2011/0129657 A1 | 6/2011 | Clough |
| 2011/0154980 A1 | 6/2011 | Van Elburg |
| 2011/0206920 A1 | 8/2011 | Ehsani |
| 2011/0214559 A1 | 9/2011 | Lampo et al. |
| 2011/0219943 A1 | 9/2011 | Arvidson et al. |
| 2011/0239851 A1 | 10/2011 | Mason et al. |
| 2012/0024140 A1 | 2/2012 | Stewart et al. |
| 2012/0064285 A1 | 3/2012 | Mathur |
| 2012/0067517 A1 | 3/2012 | Matsuoka et al. |
| 2012/0073063 A1 | 3/2012 | Downs et al. |
| 2012/0073417 A1 | 3/2012 | Ujiie et al. |
| 2012/0090452 A1 | 4/2012 | Sudhakar |
| 2012/0180633 A1 | 7/2012 | Dagher et al. |
| 2012/0183716 A1 | 7/2012 | Jordan et al. |
| 2012/0186433 A1 | 7/2012 | Braiewa et al. |
| 2012/0325076 A1 | 12/2012 | Monette, Jr. |
| 2013/0224428 A1* | 8/2013 | Clerici ................. B32B 5/26 428/114 |
| 2013/0276623 A1 | 10/2013 | Moore et al. |
| 2013/0284339 A1 | 10/2013 | Cellarius et al. |
| 2014/0076139 A1 | 3/2014 | Bergman et al. |
| 2014/0087125 A1 | 3/2014 | Ardiff |
| 2014/0260933 A1 | 9/2014 | Ardiff et al. |
| 2014/0360344 A1 | 12/2014 | Pilpel et al. |
| 2015/0253114 A1 | 9/2015 | Neal |
| 2015/0345913 A1 | 12/2015 | Inglefield et al. |

FOREIGN PATENT DOCUMENTS

| | | |
|---|---|---|
| WO | 2012/131315 | 10/2012 |
| WO | 2013/001529 | 3/2013 |
| WO | 2013/135243 | 9/2013 |

OTHER PUBLICATIONS

U.S. Appl. No. 62/012,959, filed Jun. 16, 2014.
U.S. Appl. No. 61/842,937, filed Jul. 3, 2013.
U.S. Appl. No. 61/903,337, filed Nov. 12, 2013.
U.S. Appl. No. 61/903,353, filed Nov. 12, 2013.
U.S. Appl. No. 61/978,342, filed Apr. 11, 2014.
U.S. Appl. No. 62/006,255, filed Jun. 1, 2014.
U.S. Appl. No. 13/353,185, filed Jan. 18, 2012.
U.S. Appl. No. 14/322,931, filed Jul. 3, 2014.

(56) References Cited

OTHER PUBLICATIONS

U.S. Appl. No. 14/539,259, filed Nov. 12, 2014.
U.S. Appl. No. 14/599,539, filed Jan. 18, 2015.
U.S. Appl. No. 14/599,676, filed Jan. 19, 2015.
U.S. Appl. No. 14/599,722, filed Jan. 19, 2015.
U.S. Appl. No. 14/667,173, filed Mar. 24, 2015.
U.S. Appl. No. 14/667,313, filed Mar. 24, 2015.
U.S. Appl. No. 14/667,391, filed Mar. 24, 2015.
U.S. Appl. No. 14/684,365, filed Apr. 11, 2015.
U.S. Appl. No. 14/741,400, filed Jun. 16, 2015.
PCT International Patent Application No. PCT/US14/45331, filed Jul. 3, 2014.
PCT International Patent Application No. PCT/US14/65214, filed Nov. 12, 2014.
ISR and WO in PCT/US14/45331 dated Mar. 12, 2015.
U.S. Appl. No. 14/741,400; Office Action dated May 23, 2017.

* cited by examiner

BALLISTIC RESISTANT PANEL FOR VEHICLE DOOR

CROSS-REFERENCE TO RELATED APPLICATIONS

This application claims the benefit of U.S. Provisional Application No. 62/006,255, filed Jun. 1, 2014 and is a continuation-in-part of U.S. patent application Ser. No. 14/322,931, filed Jul. 3, 2014, which claims the benefit of U.S. Provisional Application No. 61/842,937, filed Jul. 3, 2013, and U.S. Provisional Application No. 61/903,337, filed Nov. 12, 2013, all of which are hereby incorporated by reference as if fully set forth in this description.

BACKGROUND

Ballistic resistant panels can safeguard people and property from ballistic threats, such as projectiles. Ballistic resistant panels can be incorporated into vests to protect people from projectiles, such as bullets or shrapnel, and can be incorporated into vehicle doors and floors to prevent occupants and equipment from projectiles and blasts. Ballistic resistant panels are commonly made of woven fabrics consisting of high performance fibers, such as aramid fibers. When struck by a projectile, fibers in the woven fabric dissipate impact energy transferred from the projectile by stretching and breaking, thereby providing a certain level of ballistic protection.

Existing ballistic resistant panels are often made of a stack of woven ballistic sheets stitched together by a sewing process that requires an industrial sewing machine. The level of ballistic protection provided by the panel is largely dictated by the type of fibers in the woven ballistic sheets, the number of woven ballistic sheets in the stack, and the stitching pattern used to bind the woven ballistic sheets together into a panel. A wide variety of stitching patterns are used in existing panels, including quilt stitches, radial stitches, row stitches, and box stitches.

When a projectile strikes a panel made of a stack of woven ballistic sheets bound by stitching, each woven ballistic sheet dissipates a certain portion of the energy of the projectile as the projectile passes through each sheet. Within each woven ballistic sheet, individual fibers stretch and break apart as the projectile penetrates the sheet. The impact energy absorbed by a struck fiber will be transferred and dissipated to nearby fibers at crossover points where the fibers are interwoven. Also, individual stitches will stretch and break apart as the projectile enters the panel, thereby dissipating impact energy from the projectile and acting as a sacrificial element of the panel.

Due to the sacrificial nature of the fibers and stitches, the panel will be severely damaged when struck by a projectile. Visual inspection of the panel will typically reveal significant damage to the woven ballistic sheets and to stitches both at the impact location and the surrounding area. If a second projectile strikes the panel at or near the first impact location, the panel will not effectively stop the second projectile, and the second projectile will pass through the panel and into a person or property behind the panel. Therefore, existing panels do not provide reliable protection against multiple projectiles striking the panel in close proximity, which is a common threat posed by many automatic and semi-automatic weapons. For at least this reason, existing ballistic resistant panels are not well-suited for applications where multi-round capability is required.

SUMMARY

This disclosure relates to ballistic resistant panels for vehicle doors and methods of rapidly installing ballistic resistant panels in vehicle doors.

In some examples, a ballistic resistant panel can be installed within a vehicle door between an outer door structure and a side window of the vehicle door. The panel can include a plurality of ballistic sheets arranged in a stack. The stack can have an outer perimeter sized to fit within a cavity of the vehicle door. The panel can include a cover disposed over the stack. The cover can be sealed around the perimeter of the stack to form a waterproof barrier that prevents moisture on an outer surface of the cover from reaching the plurality of ballistic sheets. The panel can include an excess cover portion extending from a top edge of the ballistic resistant panel. The excess cover portion can be securable against a lip of an outer door structure by a weatherstrip. The panel can include at least one anti-wear strip adhered to the outer surface of the cover. The anti-wear strip can be configured to provide a low friction surface against which a moving part within the vehicle door may repeatedly contact without breaching the cover.

The anti-wear strip can include high-density polyethylene or polycarbonate. The panel can include an adhesive layer positioned between the outer surface of the cover and an inner surface of the anti-wear strip. The adhesive layer can serve to adhere the anti-wear strip to the outer surface to the cover. The cover can include nylon fabric coated with polyurethane, silicone, polypropylene, polyethylene, or polyvinylchloride. The cover can include rubber, nylon fabric, rayon fabric, ripstop nylon fabric, polyvinyl chloride (PVC), polyurethane, or silicone elastomer.

The ballistic resistant panel can undergo a heated vacuum bagging process to decrease its thickness and to promote at least partial bonding between adjacent ballistic sheets in the plurality of ballistic sheets to improve ballistic performance. The stack of ballistic sheets can include aramid, para-aramid, meta-aramid, polyolefin, or thermoplastic polyethylene fibers. The ballistic sheets can have uni-ply, 0/90 x-ply, or 0/90/0/90 double x-ply configurations.

The plurality of ballistic sheets can include a first, second, and third plurality of ballistic sheets. The first plurality of ballistic sheets can include aramid fibers and a first resin with a first melting temperature. The first melting temperature can be about 215-240 degrees F. The first resin can be polyethylene. The second plurality of ballistic sheets can be adjacent to the first plurality of ballistic sheets. The second plurality of ballistic sheets can include aramid fibers and a second resin with a second melting temperature. The second melting temperature can be about 255-295, 275-310, or 295-330 degrees F. The second resin can be polypropylene. The first plurality of ballistic sheets can include 1-10, 10-20, or 20-30 ballistic sheets. The second plurality of ballistic sheets can include 1-10, 10-20, or 20-30 ballistic sheets.

The ballistic resistant panel can have a thickness less than or equal to 0.24 inches and an areal density less than or equal to 1.38 lb/ft$^2$. The ballistic resistant panel can have $V_{50}$ ratings of 1600 ft/sec or greater for .44 Magnum lead bullet having a nominal mass of 15.55 grams and 1720 ft/sec or greater for a 9 mm full metal jacketed bullet having a nominal mass of 8.0 grams. The ballistic resistant panel can have a ballistic performance that meets or exceeds level III-A requirements set forth in NIJ Standard-0101.06.

In some examples, a method of rapidly installing a ballistic resistant panel within a vehicle door can be accomplished without removing a side window or trim panel from the vehicle door. The method can include removing a side window weatherstrip from the vehicle door. The method can include inserting a ballistic resistant panel through a gap in the vehicle door. The gap can be located between an outer door structure and a side window of the vehicle door. The ballistic resistant panel can include a fabric cover. The fabric cover can include an excess cover portion along a top edge of the ballistic resistant panel. The method can include pressing a bottom edge of the ballistic resistant panel downward into a V-shaped channel formed along a bottom edge of the vehicle door where the outer door structure is joined to an inner door structure. The method can include folding the excess cover portion over a lip of the outer door structure. The method can include reinstalling the side window weatherstrip onto the lip of the outer door structure and capturing the excess cover portion between the lip and the weatherstrip. The method can include lowering the side window of a vehicle door prior to inserting the ballistic resistant panel through the gap in the vehicle door.

In yet another example, a method of manufacturing a ballistic resistant panel for insertion in a vehicle door can include providing a plurality of ballistic sheets arranged to form a stack of ballistic sheets, covering the stack of ballistic sheets with a cover, inserting the stack of ballistic sheets and cover into a vacuum bag, evacuating air from the vacuum bag, heating the stack of ballistic sheets and cover in the vacuum bag to a predetermined temperature for a predetermined duration, and adhering an anti-wear strip to an outer surface of the fabric cover. The anti-wear strip can be configured to provide a low friction surface against which a moving part within the vehicle door may repeatedly contact without breaching the fabric cover of the ballistic resistant panel.

The predetermined temperature can be about 250-550, 225-550, 225-350, 250-300, 250-275, 265-275, 225-250, or 200-240 degrees F. The predetermined duration can be about 1, 5, 15-30, 30-60, 45-60, 60-120, 120-240, or 240-480 minutes. The method can include applying a predetermined pressure to the stack of ballistic sheets in the vacuum bag for a second predetermined duration. The predetermined pressure can be about 10-100, 50-75, 75-100, 100-500, 500-1,000, 1,000-2,500, 2,500-15,000, or 15,000-30,000 psi, and the second predetermined duration can be about 1, 5, 15-30, 30-60, 45-60, 60-120, 120-240, or 240-480 minutes. The heat and pressure can be applied concurrently in some examples.

Providing the plurality of ballistic sheets arranged to form a stack of ballistic sheets can include providing a first plurality of ballistic sheets, a second plurality of ballistic sheets, and a third plurality of ballistic sheets. The first plurality of ballistic sheets can have a first resin with a melting temperature of about 215-240, 240-265, 265-295, or 295-340 degrees F. The second plurality of ballistic sheets can be adjacent to the first plurality of ballistic sheets. The second plurality of ballistic sheets can include a second resin with a melting temperature of about 255-295, 295-330, 330-355, or 355-375 degrees F. The third plurality of ballistic sheets can be adjacent to the second plurality of ballistic sheets. The third plurality of ballistic sheets can include a third resin with a melting temperature of about 215-240, 240-265, 265-295, or 295-340 degrees F.

The first plurality of ballistic sheets can include 1-10, 10-20, or 20-30 x-ply ballistic sheets. The first plurality of ballistic sheets can include aramid fibers, and the first resin can be polyethylene. The second plurality of ballistic sheets can include 1-10, 10-20, or 20-30 x-ply ballistic sheets. The second plurality of ballistic sheets can include aramid fibers, and the second resin can include polypropylene. The third plurality of ballistic sheets can include 1-10, 10-20, or 20-30 x-ply ballistic sheets. The third plurality of ballistic sheets can include aramid fibers, and the third resin can include polyethylene.

Additional objects and features of the invention are introduced below in the Detailed Description and shown in the drawings. While multiple embodiments are disclosed, still other embodiments will become apparent to those skilled in the art from the following Detailed Description, which shows and describes illustrative embodiments. As will be realized, the disclosed embodiments are susceptible to modifications in various aspects, all without departing from the scope of the present disclosure. Accordingly, the drawings and detailed description are to be regarded as illustrative in nature and not restrictive.

This Summary is provided to introduce a selection of concepts in a simplified form that are further described in the Detailed Description below. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTIONS OF DRAWINGS

Figure 11:
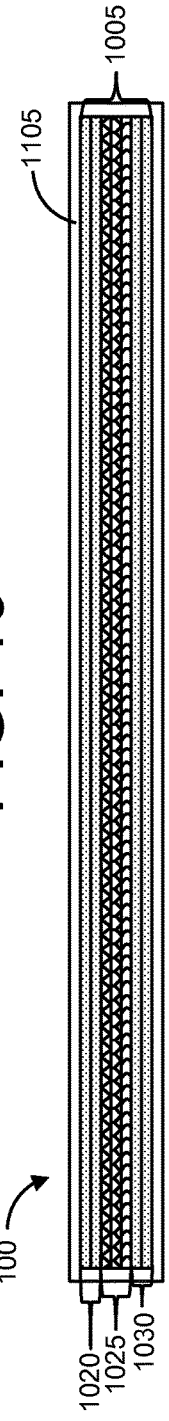

FIG. 11 is a cross-sectional side view of a flexible ballistic resistant vehicle door panel containing a stack of ballistic sheets and a waterproof cover where the stack of ballistic sheets includes a first plurality of ballistic sheets, a second plurality of ballistic sheets adjacent to the first plurality of ballistic sheets, and a third plurality of ballistic sheets adjacent to the second plurality of ballistic sheets.

Figure 12:
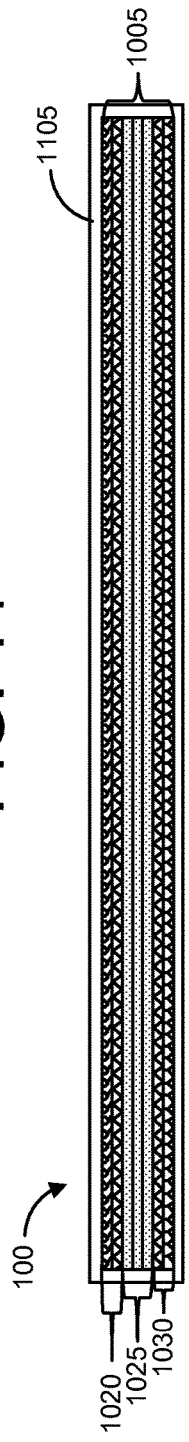

FIG. 12 is a cross-sectional side view of a flexible ballistic resistant vehicle door panel including a stack of ballistic sheets and a waterproof cover where the stack of ballistic sheets includes a first plurality of ballistic sheets, a second plurality of ballistic sheets adjacent to the first plurality of ballistic sheets, and a third plurality of ballistic sheets adjacent to the second plurality of ballistic sheets.

Figure 13:
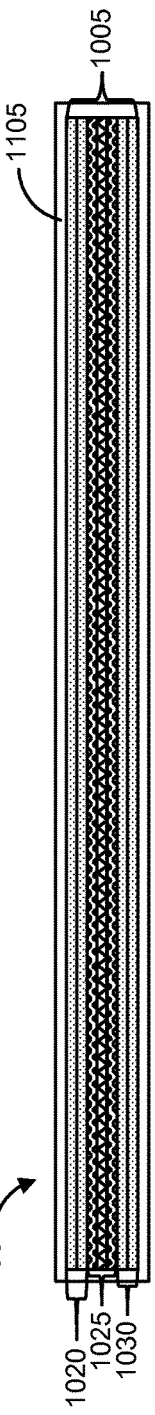

FIG. 13 is a cross-sectional side view of a flexible ballistic resistant vehicle door panel including a stack of ballistic sheets and a waterproof cover where the stack of ballistic sheets includes a first plurality of ballistic sheets, a second plurality of ballistic sheets adjacent to the first plurality of ballistic sheets, and a third plurality of ballistic sheets adjacent to the second plurality of ballistic sheets.

Figure 14:
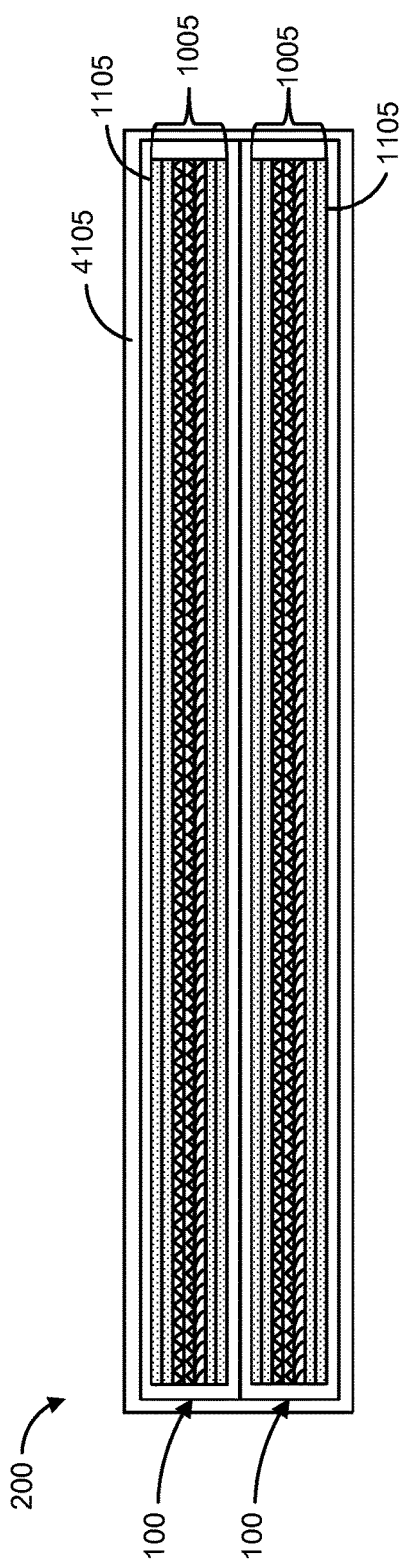

FIG. 14 is a cross-sectional side view of a ballistic resistant vehicle door panel having two flexible ballistic resistant panels encased by a cover.

Figure 15:
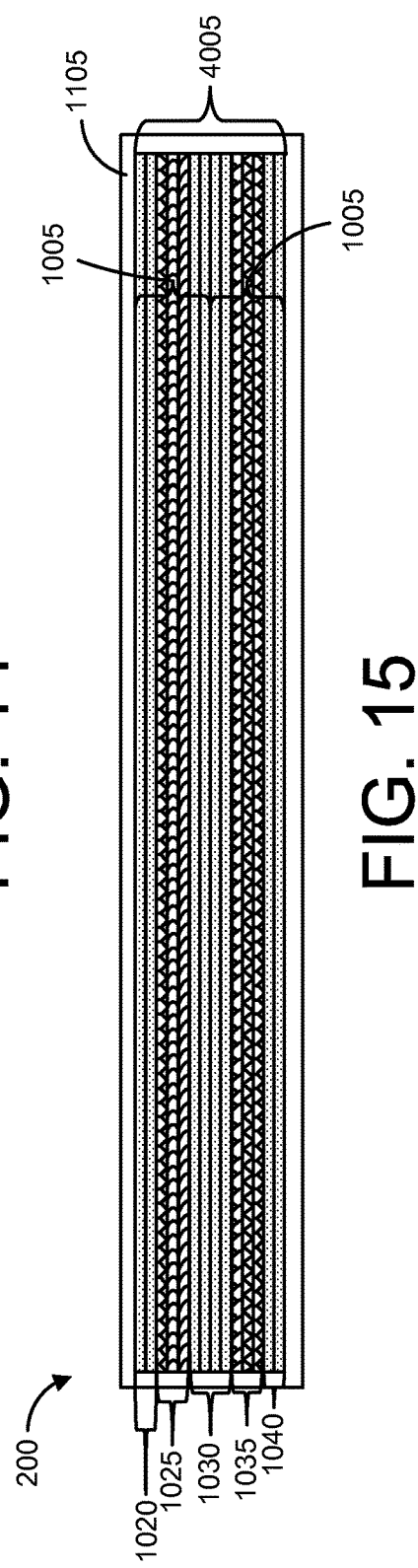

FIG. 15 shows a cross-section side view of a ballistic resistant vehicle door panel having two stacks of ballistic sheets combined within a single waterproof cover to form a combined stack of ballistic sheets including a first plurality of ballistic sheets, a second plurality of ballistic sheets, a third plurality of ballistic sheets, a fourth plurality of ballistic sheets, and a fifth plurality of ballistic sheets.

Figure 16:
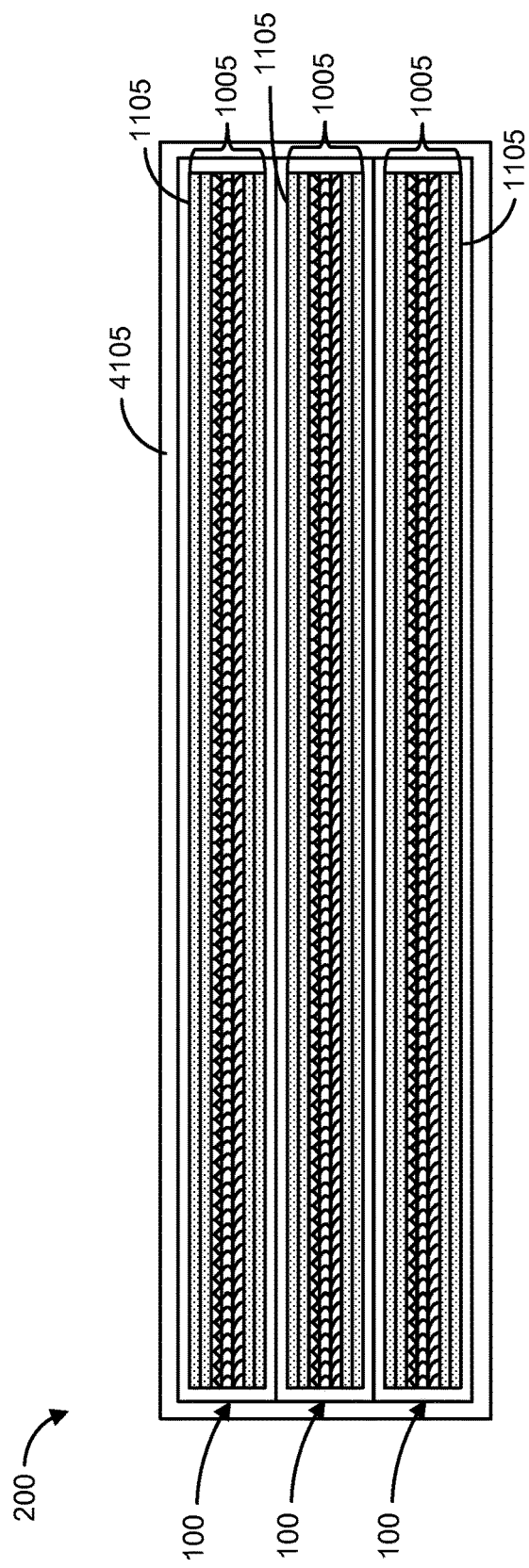

FIG. 16 is a side cross-sectional view of a ballistic resistant vehicle door panel having a stack of three flexible ballistic resistant panels within a waterproof cover, where each panel is also encased in its own cover.

Figure 17:
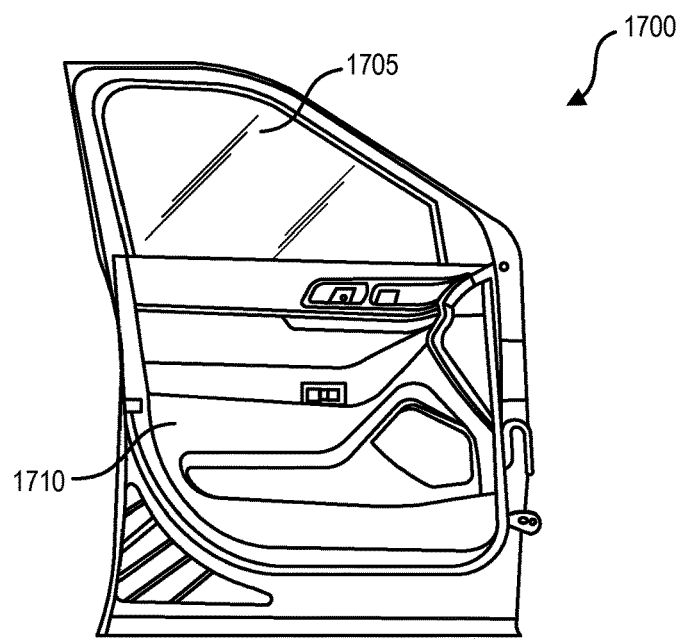

FIG. 17 shows a vehicle door including an interior trim panel and a side window.

Figure 18:
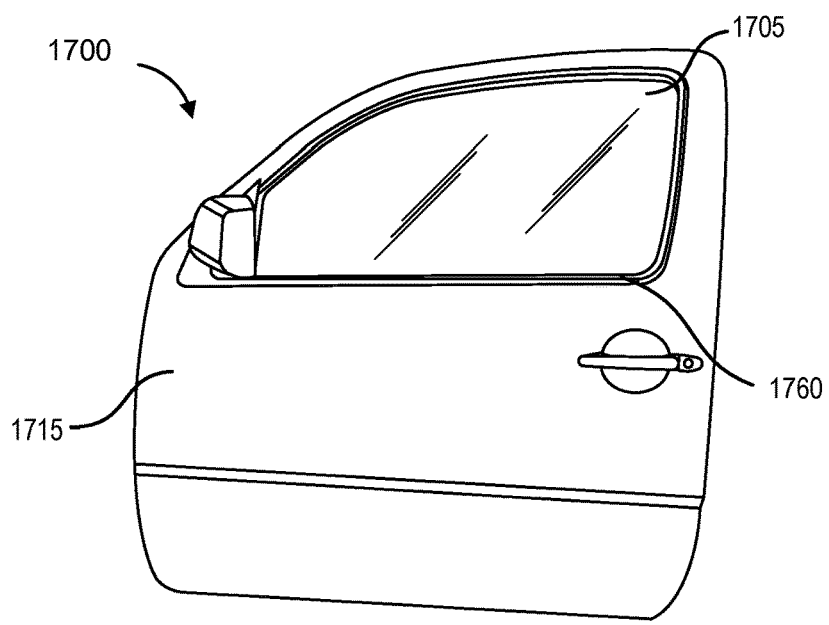

FIG. 18 shows an exterior surface of the vehicle door of FIG. 17.

Figure 19:
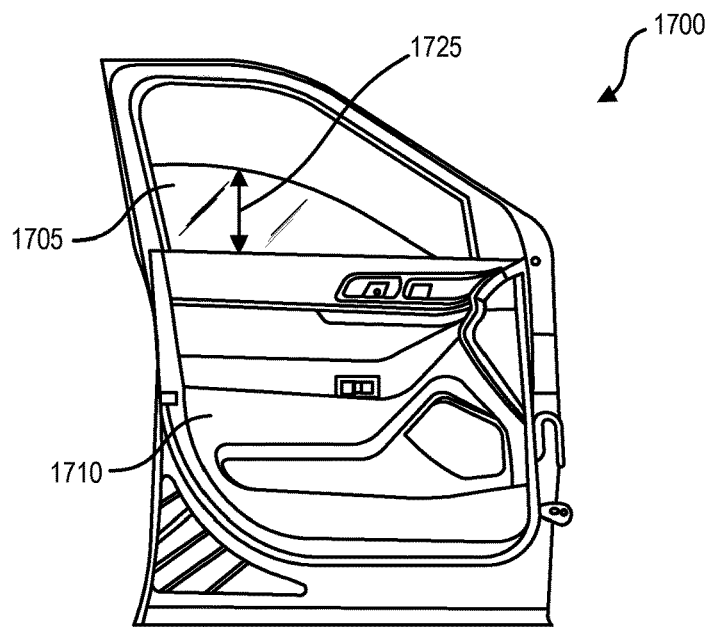

FIG. 19 shows the vehicle door of FIG. 17 with a side window partially lowered.

Figure 20:
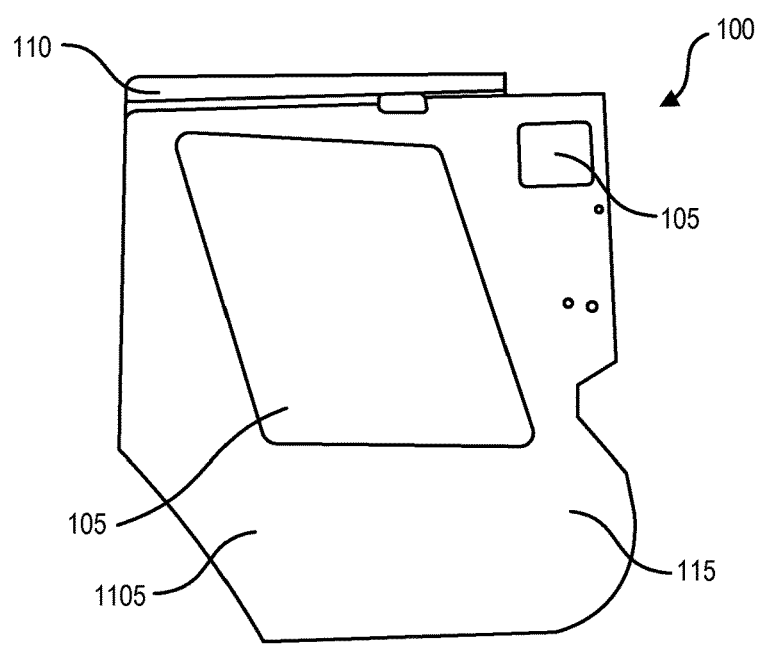

FIG. 20 shows a front view of a ballistic resistant vehicle door panel configured for installation within a vehicle door of FIG. 17 between an outer door structure and a side glass window of the vehicle door.

Figure 21:
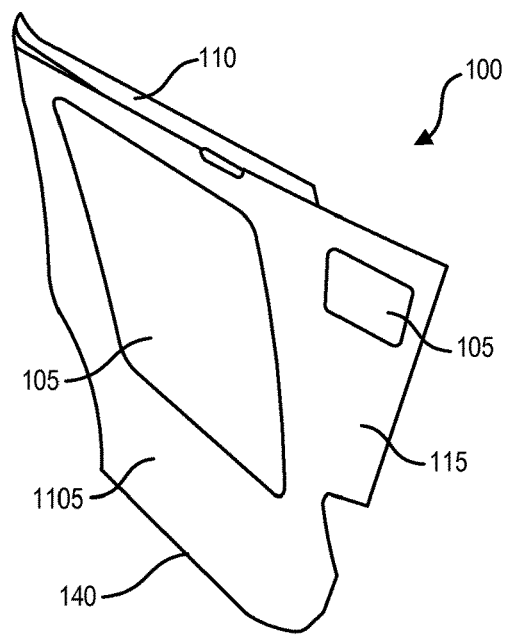

FIG. 21 shows a top perspective view of the ballistic resistant vehicle door panel of FIG. 20.

Figure 22:
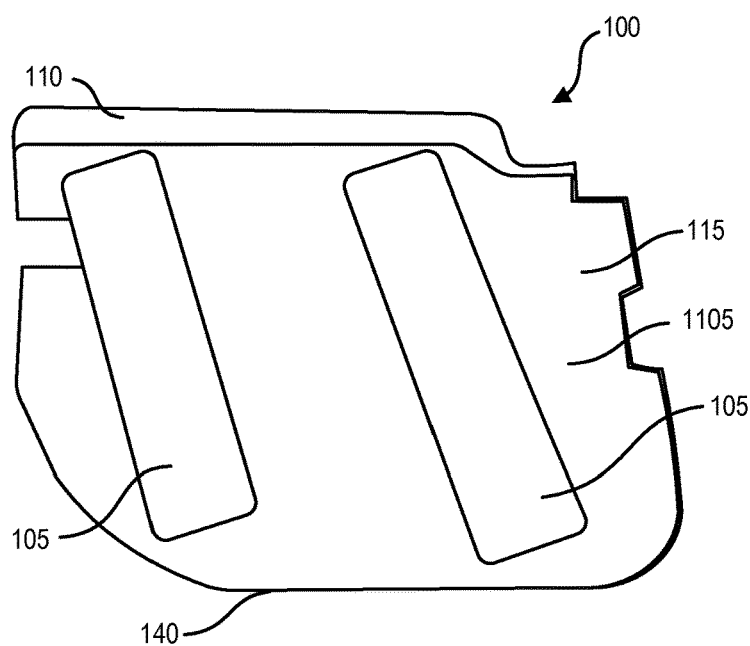

FIG. 22 shows a front view of a ballistic resistant vehicle door panel configured for installation within a vehicle door between an outer door structure and a side glass window of the vehicle door.

Figure 23:
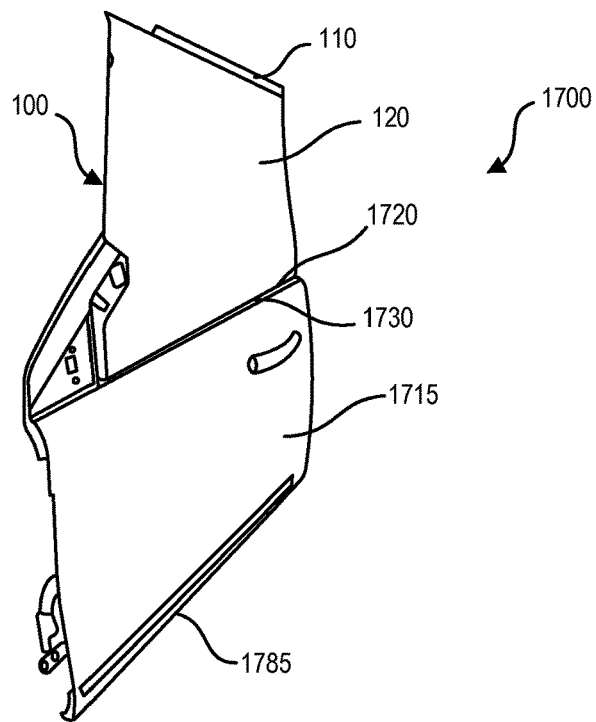

FIG. 23 shows a perspective view of the ballistic resistant vehicle door panel of FIG. 20 partially installed through a gap in the vehicle door of FIG. 17, the gap located between the outer door structure and the side glass window of the vehicle door.

Figure 24:
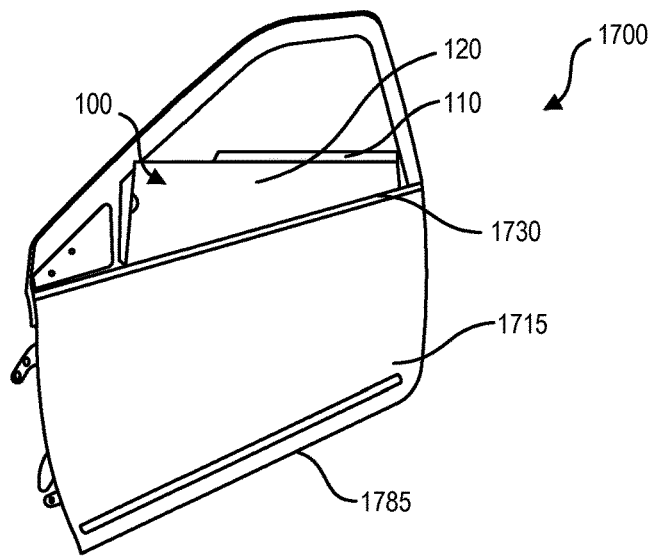
Figure 25:
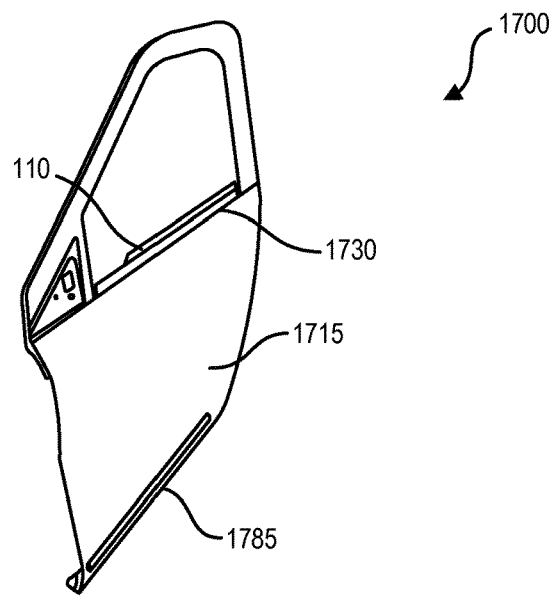
Figure 26:
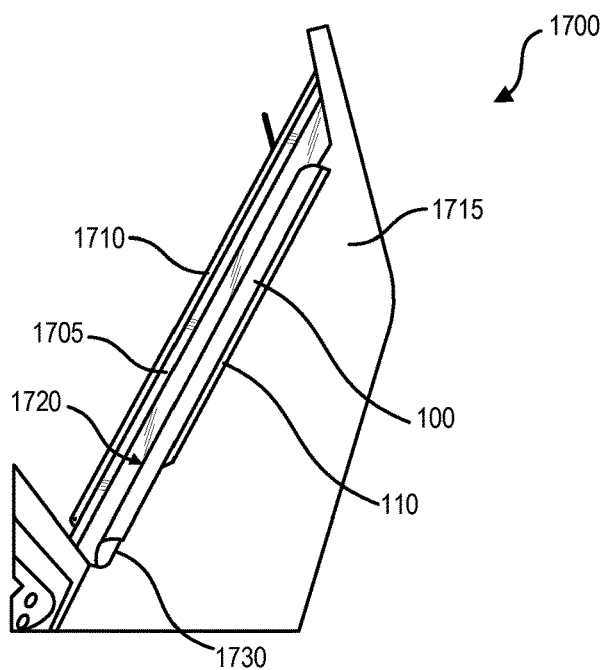

FIG. 24 shows a perspective view of the ballistic resistant vehicle door panel of FIG. 20 nearly fully installed through a gap in the vehicle door of FIG. 17, the gap located between the outer door structure and the side glass window of the vehicle door FIG. 25 shows a perspective view of the ballistic resistant vehicle door panel of FIG. 20 fully installed through a gap in the vehicle door of FIG. 17, the gap located between the outer door structure and the side glass window of the vehicle door FIG. 26 shows an enlarged view of FIG. 25 where the ballistic resistant vehicle door panel is fully installed through the gap in the vehicle door but prior to a weatherstrip being reinstalled proximate the gap to secure an excess cover portion of the ballistic resistant panel against a lip of the outer door structure.

Figure 27:
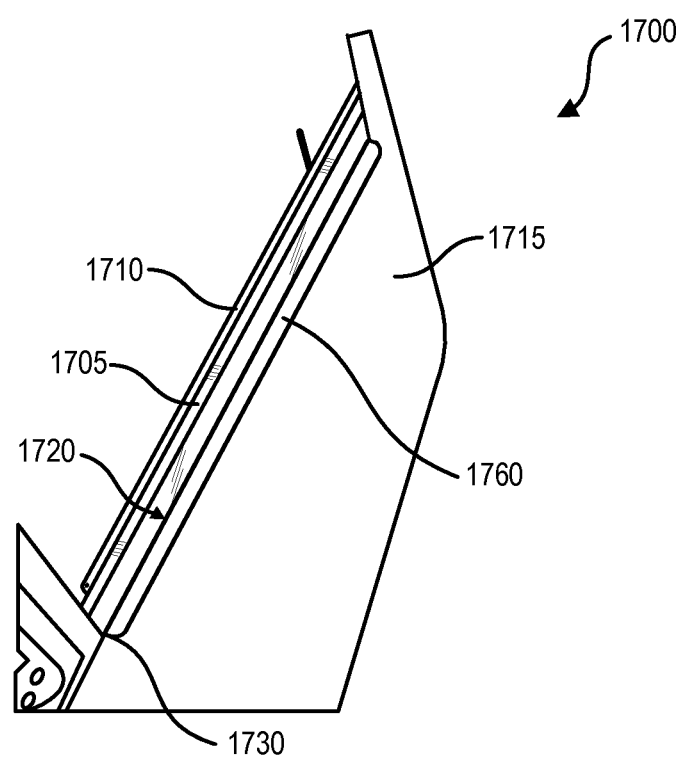

FIG. 27 shows an enlarged perspective view of the vehicle door where the ballistic resistant panel is fully installed in the vehicle door and the weatherstrip is reinstalled proximate the gap to secure the excess cover portion of the ballistic resistant panel against the lip of the outer door structure.

DETAILED DESCRIPTION

There is a strong demand among law enforcement and military departments for affordable ballistic resistant panels that can be inserted quickly and easily into vehicle doors to protect vehicle occupants (e.g. police officers) from ballistic threats. But despite this strong demand, manufacturers of ballistic resistant panels have thus far been unable to develop an affordable panel that can be quickly and easily installed in a vehicle door. Existing products require complete disassembly of the vehicle door, including removal of the side window, speaker, window track, and door trim. Some products also require a skilled installer to drill mounting holes in the door to accommodate fasteners. It can often take a skilled installer several hours to install a single panel, which results in significant installation costs to the vehicle owner, especially when panels must be installed in two or more doors. In addition to these drawbacks, existing panels also have relatively poor ballistic performance, since they are nothing more than a stack of ballistic sheets stitched together to form a panel. Moreover, existing panels lack a protective cover, which leaves the ballistic sheets exposed to dust, dirt (which is common in dessert regions where dust storms are prevalent), and moisture that can enter the door cavity and work its way between adjacent sheets, and potentially degrade the ballistic performance of the panel. The lack of a protective cover also leaves the ballistic sheets exposed to damage resulting from rubbing against certain door components, such as window bolts, which may repeatedly go up and down relative to the panel as a user actuates a power window control.

In view of the forgoing discussion, it is desirable to develop a ballistic resistant panel that can be inserted quickly and easily into a vehicle door without requiring any special skills or power tools. The ballistic resistant panel 100 described herein can be installed in a vehicle door in about 5-15 minutes by an individual with no prior training who is following a simple set of instructions. During production, the ballistic resistant panel 100 is subjected to an advanced manufacturing process, detailed herein, which results in significantly improved ballistic performance when compared to existing stitched panels having an identical number of ballistic sheets. The ballistic resistant panel 100 can include a covering 1105 that protects the ballistic sheets from moisture and wear. The ballistic resistant panel 100 can also include an anti-wear strip 105 affixed to an outer surface of the panel. The anti-wear strip 105 can provide a low friction surface against which certain moving door components, such as window bolts, are designed to rub without causing any damage to the panel's cover 1105.

The ballistic resistant panel 100 can be installed quickly and easily in a vehicle door 1700 with relatively little disassembly of the door. FIG. 17 shows a stock vehicle door 1700 prior to installation of the ballistic resistant vehicle panel 100. A weatherstrip 1760 affixed to a lip 1730 on the outer door structure 1715 can also be removed to expose a gap 1720 located between an outer door structure 1715 and the side window 1705. In some cases the weatherstrip 1760 may be affixed to the outer door structure 1715 with one or more fasteners, and in other cases, the weatherstrip may not be affixed to the outer door structure 1715 with any fasteners, as shown in FIG. 18. Where no fasteners are used, the weatherstrip 1760 may simply employ an interference fit to remain engaged with the lip 1730 of the outer door structure 1715. In these instances, an installer can simply pry the weather strip free from the lip 1730 by starting at one end of the weatherstrip 1760 and then working along the length of the weatherstrip until it is completely free of the lip.

Once the weatherstrip 1760 has been removed, a gap 1720 will be visible between the lip 1730 of the outer door structure 1715 and the side window 1705. The gap 1720 will be large enough to receive the ballistic resistant panel 100. As shown in FIGS. 20-22, the ballistic resistant panel 100 can include one or more anti-wear strips 105 adhered by an adhesive, or attached by any suitable method, to a front surface of a cover 1105 of the panel. The anti-wear strips 105 can prevent moving components within the vehicle door 1700 from damaging the panel 100 over time due to repeated contact or rubbing. The anti-wear strips 105 can provide a low friction surface, which certain components, such as window components, can slide against as the window 1705 moves up and down. The anti-wear strips 105 can have high wear-resistance and can prevent, for example, window bolts from gouging, tearing, or puncturing the cover 1105 of the panel over time with repeated actuation of the window. The anti-wear strips 105 can have any suitable shape and thickness. The shape, thickness, and location of the anti-wear strips 105 may be dictated by vehicle make and model and by the type and location of inner door components within a specific vehicle's door. Consequently, the shape, thickness, or location of anti-wear strips on a panel 100 designed for a DODGE CHARGER can differ from the shape, thickness, or location of anti-wear strips on a panel designed for a FORD EXPLORER. The anti-wear strips 105 can be made of any suitable polymer material that can be reliably adhered to the outer surface of the cover 1105. In some examples, the anti-wear strips can be made of high-density polyethylene (HDPE), perfluoroalkoxy (PFA), fluorinated ethylene propylene (FEP), or polytetrafluoroethylene (PTFE). In other examples, the anti-wear strips can be made of polycarbonate or any other suitable low friction thermoplastic. In still other examples, the anti-wear strips 105 can be made of a non-polymer material, such as a metal, having a low friction surface with high wear resistance.

In some examples, the anti-wear strips 105 can be adhered to the back surface 115 of the cover 1105 by a lamination process. An adhesive layer (e.g. liquid or film adhesive) can be applied between the back surface 115 of the cover 1105 and the mating surface of the anti-wear strip 105. A heated roller of a laminator can then apply heat and pressure to activate the adhesive and bond the anti-wear strip 105 to the panel 100. In some examples, the ballistic resistant panel can include anti-wear strips on a front surface 120 of the cover 1105. In addition to protecting the panel from wear against inner door components, the anti-wear strips can also ease installation of the panel into a cavity within the vehicle door 1700.

FIGS. 23-26 show a progression of figures chronicling an installation process. In FIG. 23, the ballistic resistant panel 100 is being fed into the gap 1720 located between the outer door structure 1715 and the side window 1705. As the panel 100 is fed into a gap, the panel will slide against the side window as it is pushed downward into the cavity of the vehicle door. The smooth surface of the side window 1705 eases installation and guides the panel 100 down into the door cavity. In some vehicles, it may be helpful to have the window completely down to ease installation of the panel 100. In other vehicles, as shown in FIG. 19, it may be desirable to keep the window up a certain distance 1725, such as 2-4, 4-6, 6-8, or 8-10 inches up to ease installation of the panel 100. In this example, an outer surface of the window glass 1705 can provide a low friction surface that aids in guiding the ballistic resistant panel 100 into place within the vehicle door 1700.

In FIG. 24, the ballistic resistant panel 100 is more than half way installed in the door. In FIGS. 25 and 26, the ballistic resistant panel is fully installed in the door, but the final step of reinstalling the weatherstrip 1760 has not yet been completed. On most vehicle doors 1700, where the outer door structure 1715 joins (e.g. is welded to) the inner door structure 1770 along the bottom edge 1785 of the door, a V-shaped channel 1785 is typically formed along the bottom edge of the door, with the opening of the V facing upward. As the ballistic resistant panel 100 is pressed downward into the cavity of the vehicle door 1700, the bottom edge 140 of the panel 100 will seat in the V-shaped channel located along the bottom edge 1785 of the door 1700, thereby immobilizing the bottom edge of the panel 100 and eliminating the need for any fasteners to secure the panel to the lower portion of the door. The bottom edge 140 of the panel 100 is effectively pinch on an inner surface and outer surface by opposing surfaces of the V-shaped channel located along the bottom edge 1785 of the door 1700.

As shown in FIGS. 25 and 26, the cover 1105 can include an excess cover portion 110 extending from a top edge of the panel 100. Once the panel 100 has been installed in the vehicle door 1700, and the bottom edge 140 of the panel has been seated in the V-shaped channel located at the bottom edge 1785 of the door 1700, the excess cover portion 110 can be folded over the lip 1730 of the outer door structure 1715, and the weatherstrip 1760 can be reinstalled over the lip, effectively capturing the excess cover portion between the lip of the outer door structure and the weatherstrip. This method of attaching the panel 100 to the door 1700 results in significant time savings compared to existing approaches. In addition, because no fasteners or drills are required, this method dramatically reduces the likelihood of installation errors and product returns. Moreover, when the time comes to uninstall the panel 100 from the vehicle door 1700, the uninstallation process is as quick and easy as the installation process and results in no damage to the panel or the vehicle door 1700. Consequently, after an inspection confirming that the panel 100 has not sustained any damage or degradation during its first deployment, the panel can be transferred to a second vehicle that is the same make and model as the first vehicle in which the panel was installed. This capability is of particular interest to law enforcement departments who regularly decommission police cruisers and attempt to salvage and reuse as many aftermarket components as possible on new police cruisers.

A method of rapidly installing a ballistic resistant panel 100 within a vehicle door 1700 can be accomplished without removing a side window 1705 or trim panel 1710 from the vehicle door. The method can include removing a side window weatherstrip 1760 from the vehicle door 1700. The method can include inserting a ballistic resistant panel 100 through a gap 1720 in the vehicle door 1700, as shown in FIGS. 23 and 24. The gap 1720 can be located between an outer door structure 1715 and a side window 1705 of the vehicle door, as shown in FIG. 26. The ballistic resistant panel 100 can include a fabric cover 1105, as shown in FIGS. 20-22. The fabric cover 1105 can include an excess cover portion 110 along a top edge of the ballistic resistant panel. The method can include pressing a bottom edge 140 of the ballistic resistant panel 100 downward into a V-shaped channel formed along a bottom edge 1785 of the vehicle door 1700 where the outer door structure 1715 is joined to an inner door structure 1710. The method can include folding the excess cover portion 110 over a lip 1730 of the outer door structure 1715. The excess cover portion 110 can be made of flexible fabric and can extend about 0.5-1, 0.75-2, or 1.5-3 inches above the ballistic resistant portion of the panel 100 to provide sufficient fabric to extend up and over the the lip 1730 of the door and rest against an exterior surface of the outer door structure 1715. The method can include reinstalling the side window weatherstrip 1760 onto the lip 1730 of the outer door structure 1715 and capturing the excess cover portion 110 between the lip 1730 and the weatherstrip 1760, as shown in FIG. 27. Once the weatherstrip 1760 has been installed, the panel 100 is effectively captured along a top edge and a bottom edge, thereby completing installation and securing of the panel within the vehicle door.

For some vehicle makes and models, the method can include lowering the side window 1705 of a vehicle door 1700 prior to inserting the ballistic resistant panel 100 through the gap 1720 in the vehicle door, as shown in FIGS. 23-27. In these instances, lowering the window 1705 prior to inserting the panel 100 can ease installation, since the panel can be inserted downward through the gap 1720 as it glides against an outer surface of the side window 1705. This approach can reduce the risk of the panel 100 catching on a mechanism inside the door and frustrating installation. The side window 1705 can also help to guide the panel 100 into place within the vehicle door 1700 as the panel is pressed downward until the bottom edge seats in the V-shaped channel formed along the bottom edge 1785 of the door.

In some instances, the panel 100 may need to be first inserted downward through the gap 1720, and once seated in the V-shaped channel, the entire panel may need to be shifted forward toward a front end of the vehicle to improve ballistic protection near a front edge of the vehicle door. This approach may be needed where, due to a vehicle door's irregular shape, a rectangular panel 100 is not suitable and a more sophisticated shape is needed. In examples, where repositioning of the panel is required once the bottom edge 140 of the panel is seated in the V-shaped channel along the bottom edge of the door, the excess cover portion 110 can provide a suitable place to grab the panel to facilitate repositioning.

In some instances, the panel 100 can contour to an inner surface of the outer door structure 1715. This can be accomplished by pre-forming the panel 100 to have a curvature matching a curvature of the outer door structure 1715. In another example, once the bottom edge 140 of the panel 100 is seated against in the V-shaped channel of the door, additional downward pressure can be applied along a top edge of the panel 100, resulting in outward flexing of the panel in response to the vertical load. The panel 100 can flex outwardly and contour to the inner surface of the outer door structure 1715. Contouring the panel 100 to the inner surface of the outer door structure 1715 can be desirable to provide additional clearance between internal door mechanisms and the panel 100, thereby reducing the likelihood of panel wear or other complications.

Ballistic Resistant Door Panel

Ballistic resistant panels 100 are described herein that have significantly better multi-shot capability than existing panels. In addition, the ballistic resistant panels described herein can be lighter, thinner, more flexible, easier to conceal, and less expensive to manufacture than existing panels. The panels described herein can be made in a reversible configuration where either side of the panel can serve as a strike face, thereby avoiding risks associated with user error. The panels described herein can prevent ricochet of projectiles (which is an inherent drawback of metal armor) by, for example, encapsulating the projective through controlled delamination and energy absorption. The panels described herein can experience significantly less back face deformation than existing panels when exposed to an identical ballistic threat. Methods of manufacturing the ballistic resistant panels, as described herein, can involve one or more steps, including cutting ballistic sheets, stacking ballistic sheets, sealing ballistic sheets within a waterproof cover, vacuum bagging a stack of ballistic sheets, heating a stack of ballistic sheets, applying pressure to a stack of ballistic sheets, cooling a stack of ballistic sheets, trimming a waterproof cover, and breaking-in the ballistic panel.

The ballistic resistant panels 100 described herein are capable of absorbing and dissipating energy from high-velocity impacts through one or more of the following energy-absorbing mechanisms: spall formation, tensile fiber failure, fiber de-bonding, fiber pullout, and interlayer delamination. The term "panel," as used herein, can describe any 3-dimensionally shaped ballistic resistant apparatus, including a flat or contoured shape having any suitable perimeter shape, including regular or irregular perimeter shapes. In some applications, the panel 100 may include one or more openings. For example, if the panel is used within a vehicle door 1700, the panel may include an opening to accommodate a component located within the door, such as a wiring harness.

Wide Ranging Applications

The flexible ballistic resistant panels 100 described herein are lightweight and flexible and can be used in a wide range of vehicle-related applications that require dissipation of impact energy. For instance, the flexible ballistic resistant panels 100 described herein can serve as spall liners in tanks and other armored vehicles to protect against, for example, the effects of high explosive squash head (HESH) anti-tank shells. Spall liners can serve as a secondary armor for occupants and equipment within an armored vehicle having a primary armor made of steel, ceramic, aluminum, or titanium. In the event of an impact or explosion proximate an outer surface of the armored vehicle, the spall liner can prevent or reduce fragmentation into the vehicle cabin, which is desirable, since fragmentation can result in fragments flying into the vehicle cabin, which may cause more injury to vehicle occupants than the original explosion. When used as a spall liner, the ballistic resistant panels 100 can be positioned between exterior steel armor plating of the military vehicle and the cabin of the vehicle. To provide adequate protection against spall, it may be necessary to provide a stack of ballistic resistant panels, where the stack includes one or more ballistic panels 100 in combination.

The flexible ballistic resistant panels 100 described herein can be incorporated into vehicle doors, floors, firewalls, roofs, and seats to protect the vehicle, occupants, equipment, and ammunitions in the vehicle from projectiles. Due to their light weight and low cost, the panels 100 described herein can be incorporated into consumer vehicles without significantly reducing fuel economy or increasing vehicle cost. In addition to protecting against ballistic threats, the panels 100 may improve certain aspects of crash performance of vehicles. Due to the flexibility and thinness of the panels 100, a panel can be installed into a vehicle door between a door window and window seal. This allows existing vehicles to be easily armored without needing to fully disassemble the door panels. The flexible panel can be easily inserted into a door cavity and can be contorted around door components. Due to the relatively soft nature of the panels described herein, the panels do not cause unwanted noise or vibration.

No Stitching Required

An advantage of the flexible ballistic resistant panels 100 described herein over existing panels is that no stitching is required to manufacture the panels. Instead of stitching, combinations of processes described herein (e.g. vacuum-bagging, applying heat, applying pressure) result in full or partial bonding between adjacent layers of ballistic sheets in the stack 1005. This full or partial bonding resists movement of the ballistic sheets relative to each other (similar to how a stitch would) and improves performance of the panel when struck by a projectile. Panels without stitching are far less labor intensive than panels with stitching and don't require access to industrial sewing machines. Consequently, panels without stitching can be manufactured at a lower cost.

Ballistic Sheet Construction

A ballistic resistant panel can be made of one or more ballistic sheets. The term "sheet," as used herein, can describe one or more layers of any suitable material, such as a polymer, metal, fiberglass, or composite material, or combination thereof. Examples of polymers include aramids, para-aramids, meta-aramids, polyolefins, and thermoplastic polyethylenes. Examples of aramids, para-aramids, meta-aramids include NOMEX, KERMEL, KEVLAR, TWARON, NEW STAR, TECHNORA, HERACRON, and TEIJINCONEX. An example of a polyolefin is INNEGRA. Examples of thermoplastic polyethylenes include TENSYLON from E. I. du Pont de Nemours and Company, DYNEEMA from Dutch-based DSM, and SPECTRA from Honeywell International, Inc., which are all examples of ultra-high-molecular-weight polyethylenes (UHMWPE). Examples of types of glass fibers include A-glass, C-glass, D-glass, E-glass, E-CR-glass, R-glass, S-glass, and T-glass. Other suitable fibers include M5 (polyhydroquinone-diimidazopyridine), which is both high-strength and fire-resistant.

A ballistic sheet 10 can be constructed using any suitable manufacturing process, such as extruding, die cutting, forming, pressing, weaving, rolling, etc. The sheet can include a woven or non-woven construction of a plurality of fibers bonded by a resin, such as a thermoplastic polymer, thermoset polymer, elastic resin, or other suitable resin. In one example, the ballistic sheet 10 can include a plurality of aramid bundles of fibers 11 bonded by a resin containing 16, for example, polypropylene, polyethylene, polyester, or phenol formaldehyde. The plurality of bundles of fibers 11 in the sheet 10 can be oriented in the same direction, thereby creating a unidirectional fiber arrangement, known as a uni-ply ballistic sheet 10.

Figure 3:
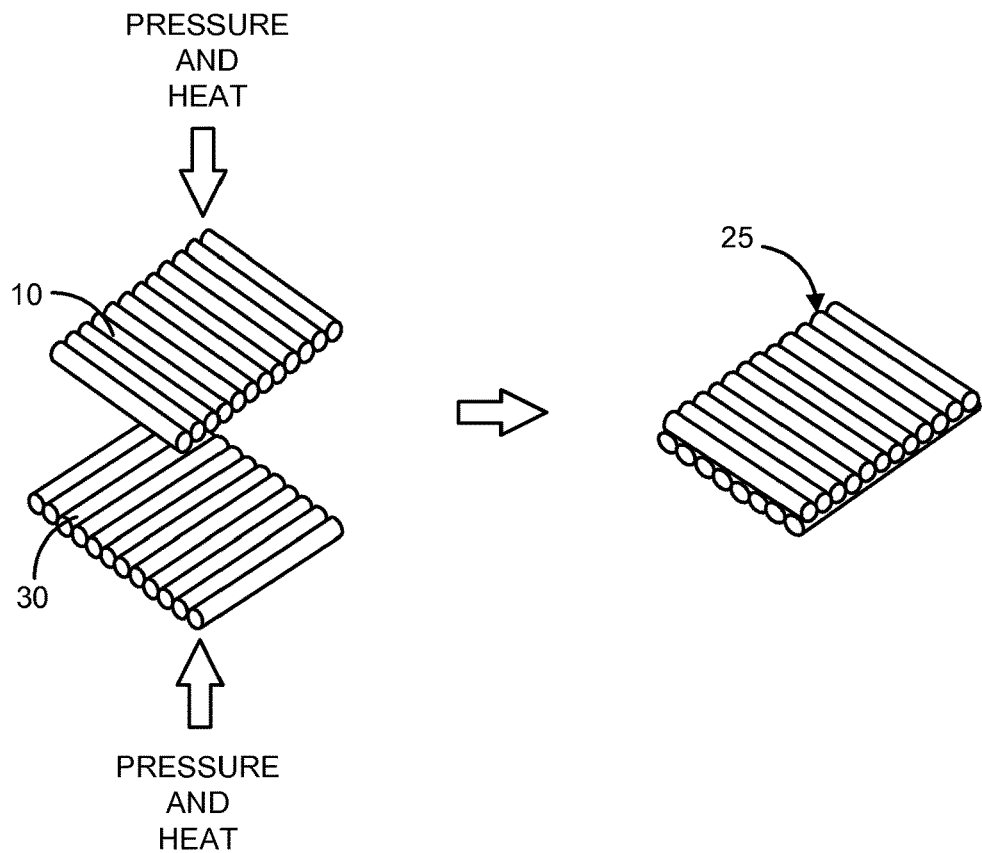
FIG. 3 shows a process of forming a 0/90 x-ply ballistic sheet from two unidirectional ballistic sheets.

In some examples, the ballistic sheet 10 can include fibers 11 that are pre-impregnated with a resin, such as thermoplastic polymer, thermoset polymer, epoxy, or other suitable resin. The fibers 11 can be arranged in a woven pattern or arranged unidirectionally, as shown in FIG. 3. The resin can be partially cured to allow for easy handling and storage of the ballistic sheet prior to formation of the panel. To prevent complete curing (e.g. polymerization) of the resin before the sheet 10 is incorporated into a panel, the ballistic sheet may require cold storage.

Figure 1:
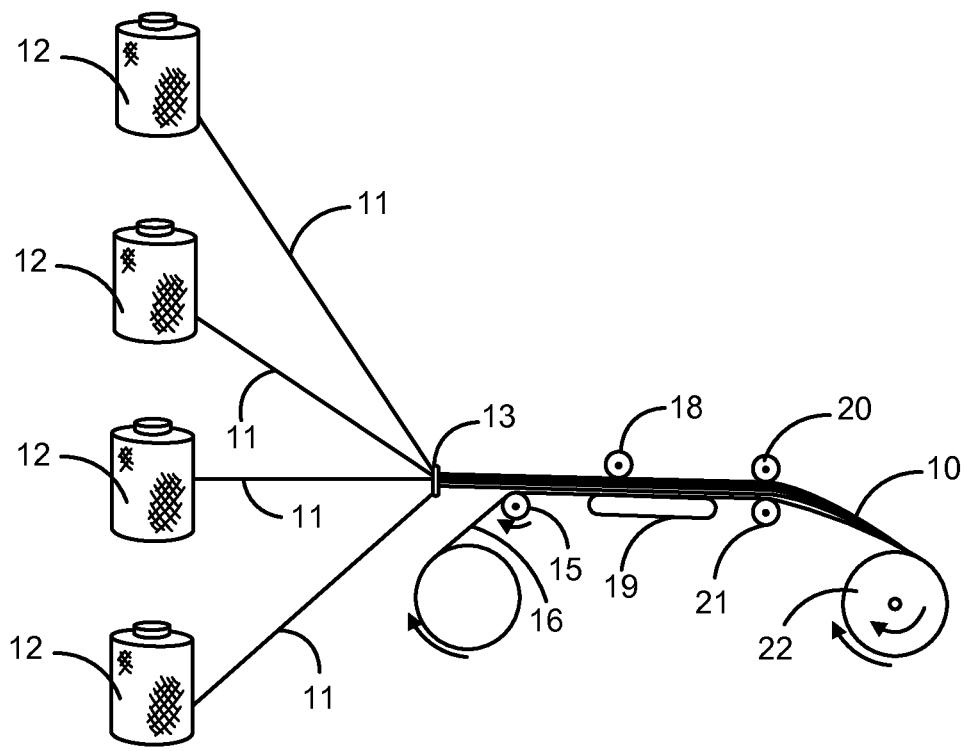
FIG. 1 shows a process of fabricating a roll of ballistic sheet material using a plurality of fibers drawn from creels.

Certain ballistic sheets are described in U.S. Pat. No. 5,437,905, which is hereby incorporated by reference in its entirety. FIG. 1 shows an example method for forming an array from a plurality of bundles of fibers 11. The bundles of fibers 11 can be supplied from a plurality of yarn creels 12. The bundles of fibers 11 can pass through a comb guide 13 where the bundles of fibers are arranged in a parallel orientation and formed into an array and passed over a resin application roller 15 where a resin film 16, such as a thin polyethylene or polypropylene film or other suitable film, is applied to one side of the array. The bundles of fibers 11 may be twisted or stretched prior to passing over the resin application roller 15 to increase their tenacity. A pre-lamination roller 18 can then press the array of bundles of fibers 11 against the resin film 16, which is then pressed against a heated plate 19, which causes the resin film to adhere to the array. After heating, the bundles of fibers 11 and the resin film 16 can be passed through a pair of heated pinch rolls 20, 21 to form a ballistic sheet. The ballistic sheet 10 can then be wound onto a roll 22.

Figure 2:
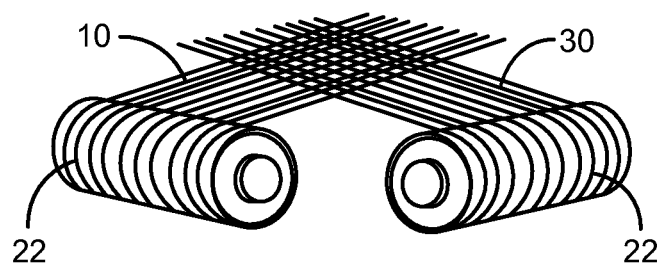
FIG. 2 shows a process of forming a 0/90 x-ply ballistic sheet from two rolls of unidirectional ballistic sheet material.
Figure 4:
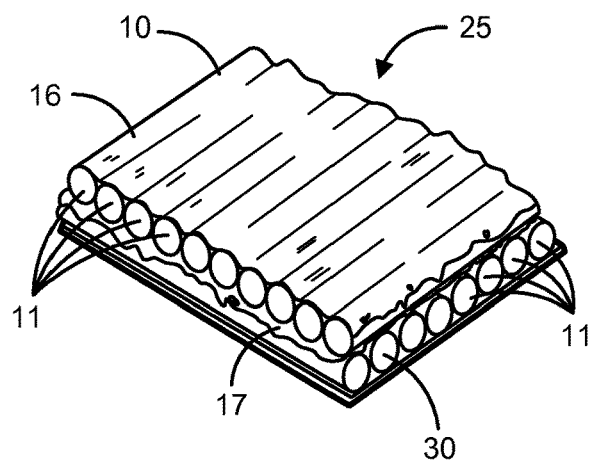
FIG. 4 shows an enlarged view of a portion of a 0/90 x-ply ballistic sheet containing two unidirectional ballistic sheets bonded by two layers of resin film.

As shown in FIGS. 2-4, two ballistic sheets, known as uni-ply, having unidirectional arrangements of fibers 10 can be bonded together to produce a configuration known as x-ply 25. X-ply 25 can include a first ballistic sheet 10 and a second ballistic sheet 30, each having a two-dimensional arrangement of unidirectionally-oriented fibers 11. The second ballistic sheet 30 can be arranged at a 90-degree angle with respect to the first ballistic sheet 10, which is set to a reference angle of 0-degrees, as shown in FIG. 3. This configuration is known as 0/90 x-ply, where "0" and "90" denote the relative orientations (in degrees) of the bundles of fibers 11 within the first and second ballistic sheets (10, 30), respectively. The first ballistic sheet 10 can be laminated to the second ballistic sheet 30 in the absence of adhesives or bonding agents. Instead, a first thermoplastic film 16 and second thermoplastic resin film 17 can be bonded to the outer surfaces of the first and second ballistic sheets (10, 30) without penetration of the resin films into the bundles of fibers 11 or through the laminated sheets from one side to the other. Through a process involving heat and pressure, as shown in FIG. 3, the resin films (16, 17) melt and subsequently solidify to effectively laminate the uni-ply ballistic sheets (10, 30) to each other, as shown in FIG. 4, thereby producing a 0/90 x-ply configuration.

Ballistic Sheet Resin

Ballistic sheets (e.g. 25) can be coated or impregnated with one or more resins (e.g. 16). Certain resins, such as resins made of thermoplastic polymers, may include long chain molecules. The chains of molecules may be held close to each other by weaker secondary forces. Upon heating, the secondary forces may be reduced, thereby permitting sliding of the chains of molecules and resulting in visco-plastic flow and ease in molding. Heating of the ballistic sheets (e.g. 25) may cause softening of the resin, and the resin may become tacky as it softens. Softening may occur at the softening point, which is the temperature at which the resin softens beyond some arbitrary softness and can be determined, for example, by the Vicat method (ASTM-D1525). Applying pressure to the stack of ballistic sheets 1005 when the resin is softened and tacky may result in a softened resin layer on a first ballistic sheet contacting and adhering to a second ballistic sheet that is adjacent to the first ballistic sheet, and when the panel 100 is subsequently cooled and the temperature of the resin is reduced, the first and second ballistic sheets may be partially or fully bonded to each other. In one example, ballistic sheets in a panel may be coated or impregnated with a polypropylene resin, and the polypropylene resin may have a melting point of about 255-295 or 295-330 degrees F. In another example, ballistic sheets in a panel may be coated or impregnated with a polyethylene resin, and the polyethylene resin may have a melting point of about 215-240 degrees F. During a manufacturing process to make a ballistic resistant panel 100, the stack of ballistic sheets 1005 may be heated to a temperature near the melting point of the resin to cause softening of the resin, and pressure may be applied to the stack of ballistic sheets to press adjacent ballistic sheets closer together. When the panel 100 is cooled, and the temperature of the resin is reduced, adjacent ballistic sheets (e.g. 25) may be left partially or fully bonded to each other.

When forming a ballistic panel 100 from one or more ballistic sheets (e.g. 25) containing one or more resins, a suitable processing temperature for the panel can be dictated, at least partly, by the resin type and resin content (i.e. percent weight) of the ballistic sheets. Selecting a resin with a lower melting point may reduce a target processing temperature for the panel 100, and selecting a resin with a higher melting point may increase the target processing temperature for the panel. The amount of partial or full bonding that occurs between adjacent ballistic sheets in the stack can be controlled, at least in part, by resin selection, resin content, process temperature, and process pressure.

Commercially-Available Ballistic Sheets

Ballistic resistant sheets constructed from high performance fibers, such as fibers made of aramids, para-aramids, meta-aramids, polyolefins, or ultra-high-molecular-weight polyethylenes, are commercially available from a variety of manufacturers. Several specific examples of commercially-available ballistic resistant sheets made of high performance fibers are provided below. Ballistic resistant sheets are commercially-available in many configurations, including uni-ply, 0/90 x-ply, and 0/90/0/90 double x-ply configurations. Ballistic resistant sheeting material can be ordered in a wide variety of forms, including tapes, rolls, sheets, structural sandwich panels, and preformed inserts, which can all be cut to size during a manufacturing process.

TechFiber, LLC, located in Arizona, manufactures a variety of ballistic resistant sheets made of aramid fibers that are sold under the trademark K-FLEX. One version of K-FLEX is made with KEVLAR fibers having a denier of about 1000 and a pick count of about 18 picks per inch. Certain versions of K-FLEX can have a resin content of about 15-20%. Different versions of K-FLEX may contain different resins. For instance, a first version of K-FLEX can include a resin (e.g. a polyethylene resin) with a melting temperature of about 215-240 degrees F., a second version of K-FLEX can include a resin with a melting temperature of about 240-265 degrees F., a third version of K-FLEX can include a resin with a melting temperature of about 265-295 degrees F., and a fourth version of K-FLEX can include a resin with a melting temperature of about 295-340 degrees F. K-FLEX is available in uni-ply, 0/90 x-ply, and 0/90/0/90 double x-ply configurations.

TechFiber, LLC also manufactures a variety of unidirectional ballistic resistant sheets made of aramid fibers that are sold under the trademark T-FLEX. Certain versions of T-FLEX can have a resin content of about 15-20% and can include aramid fibers such as TWARON fibers (e.g. model number T765). Different versions of T-FLEX may contain different resins. For instance, a first version of T-FLEX can include a resin (e.g. a polyethylene resin) with a melting temperature of about 215-240 degrees F., a second version of T-FLEX can include a resin with a melting temperature of about 240-265 degrees F., a third version of T-FLEX can include a resin with a melting temperature of about 265-295 degrees F., and a fourth version of T-FLEX can include a resin with a melting temperature of about 295-340 degrees F. T-FLEX is available in uni-ply, 0/90 x-ply, and 0/90/0/90 double x-ply configurations.

Polystrand, Inc., located in Colorado, manufactures a variety of unidirectional ballistic resistant sheets made of aramid fibers that are sold under the trademark THERMOBALLISTIC. One version of THERMOBALLISTIC ballistic resistant sheets are sold as product number TBA-8510 and include aramid fibers with a pick count of about 12.5 picks per inch. Other versions of THERMOBALLISTIC ballistic resistant sheets are sold as product numbers TBA-8510X and TBA-9010X and include aramid fibers (e.g. KEVLAR fibers) and have a 0/90 x-ply configuration. In certain versions, the resin content of the THEMROBALLISTIC ballistic resistant sheets can be about 10-20% or 15-20%. Different versions of THERMOBALLISTIC ballistic resistant sheets may contain different resins. For instance, a first version of THERMOBALLISTIC ballistic resistant sheets can include a resin with a melting temperature of about 225-255 degrees F., a second version of THERMOBALLISTIC ballistic resistant sheets can include a resin (e.g. a polypropylene resin) with a melting temperature of about 255-295 degrees F., a third version of THERMOBALLISTIC ballistic resistant sheets can include a resin (e.g. a polypropylene resin) with a melting temperature of about 295-330 degrees F., a fourth version of THERMOBALLISTIC ballistic resistant sheets can include a resin with a melting temperature of about 330-355 degrees F., and a fifth version of THERMOBALLISTIC ballistic resistant sheets can include a resin with a melting temperature of about 355-375 degrees F. One version of THERMOBALLISTIC ballistic resistant sheets can include a polypropylene resin. THERMOBALLISTIC ballistic resistant sheets are available in uni-ply, 0/90 x-ply, and 0/90/0/90 double x-ply configurations.

E. I. du Pont de Nemours and Company (DuPont), headquartered in Delaware, manufactures a ballistic resistant sheet material made of ultra-high-molecular-weight polyethylene fabric that is sold under the trademark TENSYLON. A Material Data Safety Sheet was prepared on Feb. 2, 2010 for a material sold under the tradename TENSYLON HTBD-09-A (Gen 2) by BAE Systems TENSYLON High Performance Materials. The Material Safety Data Sheet is identified as TENSYLON MSDS Number 1005, is publicly available, and is hereby incorporated by reference in its entirety. The ballistic resistant sheets are marketed as being lightweight and cost-effective and boast low back face deformation, excellent flexural modulus, and superior multi-threat capability over other commercially available ballistic resistant sheets. The ballistic resistant sheet material can be purchased on a roll and can be cut into ballistic resistant sheets having a size and shape dictated by an intended application.

Honeywell International, Inc., headquartered in New Jersey, manufactures a variety of ballistic resistant sheets made of aramid fibers that are sold under the trademarks GOLD SHIELD and GOLD FLEX. One version of GOLD SHIELD ballistic resistant sheets are sold under product number GN-2117 and are available in 0/90 x-ply configurations and have an areal density of about 3.2 ounces per square yard.

Barrday, Inc., headquartered in Cambridge, Ontario, manufactures a variety of ballistic resistant sheets made of para-aramid fibers that are sold under the trademark BARRFLEX. One version of BARRFLEX ballistic resistant sheets is sold as product number U480 and is available in 0/90 x-ply configurations. Each layer of the ballistic resistant sheet is individually constructed with a thermoplastic film laminated to a top and bottom surface.

Teijin Limited, headquartered in the Netherlands, manufactures a ballistic resistant sheet material made of ultra-high-molecular-weight polyethylene fabric in a solvent-free process. The sheet material is sold under the trademark ENDUMAX and is available with a thickness of about 55 micrometers.

Ply-Tech, Inc., located in New Braunfels, Tex. manufactures a variety of ballistic resistant sheets made of aramid fibers that are sold under the trademark KM2 1000. One version of KM2 1000 is made of 1,000 denier KEVLAR KM2 brand yarn from DuPont and is a biaxial (i.e. 0/90 X-ply) ballistic resistant sheet 250 with a fabric weight (i.e. areal density) of about 5.7 ounces per square yard. The KM2 1000 0/90 X-ply ballistic resistant sheet 250 can include two uni-ply ballistic resistant sheets (e.g. 50, 55) bonded together with an adhesive resin. Each uni-ply ballistic sheet (e.g. 50, 55) can include a plurality of KM2 brand fibers arranged unidirectionally to form a two-dimensional arrangement of fibers, and the sheets can be cross-plied to provide a 0/90 X-ply configuration. A polyethylene film can be applied over each uni-ply ballistic resistant sheet prior to joining the sheets with adhesive resin to form the 0/90 X-ply ballistic resistant sheet 250.

Vectorply Corporation, located in Phenix City, Ala. manufactures a variety of stitch-bonded multiaxial fabrics. Stitch-bonded multiaxial fabrics can include cross-plies of high-performance fabrics that are stitched together. In one example, a quad-axial stitch-bonded fabric can include four plies arranged at 0, 90, 45, and −45 degrees, respectively and bonded with tricot stitching. Each ply can be made of a plurality of unilaterally arranged fibers, such as carbon fibers, Kevlar fibers, or UHMWPE fibers. The stitch style and density can alter the performance of the fabric. The stitch pattern can be, for example, chain, tricot, or modified tricot. In a manufacturing process, needles can be mounted on a stitch bar, which can simultaneously move vertically and horizontally to form a desired stitch pattern. Stitch yarn can be polyester, fiberglass, nylon, Nomex, aramid fiber, UHMWPE (e.g. Honeywell Spectra) fiber, or carbon fiber.

Protective Cover

Figure 7:
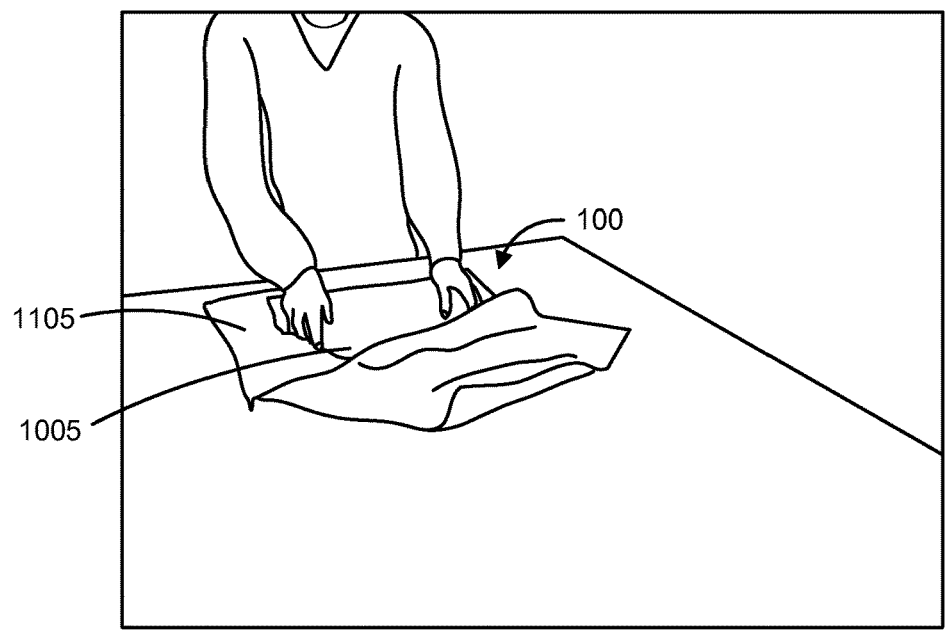
FIG. 7 shows a process of arranging a stack of ballistic sheets according to a two-dimensional pattern inside a waterproof cover prior to a vacuum bagging process.

The stack of ballistic sheets 1005 can be encased in a protective cover 1105. In one example, protective cover 1105 can be a waterproof cover, thereby producing a waterproof ballistic resistant panel. The waterproof cover 1105 can be adapted to prevent the ingress of liquid through the cover toward the ballistic sheets encased by the cover. FIG. 7 shows one step of a manufacturing process for making a flexible ballistic resistant panel. In FIG. 7, a stack of ballistic sheets 1005 is being positioned within a waterproof cover 1105 prior to a vacuum bagging process. Preventing water ingress can be desirable, since moisture can negatively affect the performance of the ballistic sheets. In particular, moisture can negatively affect tensile strength of certain fibers 11 (e.g. aramid fibers) within the ballistic sheets (e.g. 25), thereby resulting in the sheets being less effective at dissipating impact energy from a projectile.

The protective cover 1105 can be made from any suitable material such as, for example, rubber, NYLON, RAYON, ripstop NYLON, CORDURA, polyvinyl chloride (PVC), polyurethane, silicone elastomer, fluoropolymer, or any combination thereof. The cover 1105 can be a coating that contains polyurethane, polyuria, or epoxy, such as a coating sold by Rhino Linings Corporation, located in San Diego, Calif. In another example, the waterproof cover 1105 can be made from any suitable waterproof or non-waterproof material and coated with a waterproof material such as, for example, rubber, PVC, polyurethane, polytetrafluoroethylene, silicone elastomer, fluoropolymer, wax, or any combination thereof. In one example, the cover 1105 can be made from NYLON coated with PVC. In another example, the cover can be made from NYLON coated with thermoplastic polyurethane. The cover 1105 can be made of any suitable material, such as about 50, 70, 200, 400, 600, 840, 1050, or 1680-denier NYLON coated with thermoplastic polyurethane. In yet another example, the cover can be made from 1000-denier CORDURA coated with thermoplastic polyurethane.

In addition to being made of a waterproof material that protects the ballistic sheets (e.g. 25) from water ingress, the protective cover 1105 can also be made of a chemically-resistant material to protect the ballistic sheets if the panel were ever exposed to acids or bases. Certain acids and bases can cause the tenacity of certain fibers, such as aramid fibers, to degrade over time, where "tenacity" is a measure of strength of a fiber or yarn. It is therefore desirable, in certain applications where exposure to chemicals is possible, for the cover 1105 to be resistant to acids and bases to prevent the cover from deteriorating if ever exposed to acids or bases. Deterioration of the cover would be undesirable, since it would permit the acids and bases to breach the cover material and reach the stack of ballistic sheets 1005 inside the cover. To this end, the cover 1105 can be made of a chemically-resistant material or can include a chemically-resistant coating on an outer surface of the cover. For instance, the cover 1105 can include a thermoplastic polymer coating on an outer surface of the cover. Examples of chemically-resistant thermoplastic polymers that can be used to coat the cover include polypropylene, low-density polyethylene, medium-density polyethylene, high-density polyethylene, ultra-high-molecular-weight polyethylene, and polytetrafluoroethylene (e.g. TEFLON).

The protective cover 1105 can made of a flame-resistant or flame-retardant material. In one example, the cover 1105 can include a flame-resistant or flame-retardant material mixed with a base material. In another example, the cover 1105 can include a base material coated with a flame-resistant or flame-retardant material. In yet another example, the cover can include a base material with a flame-resistant or flame-retardant material chemically bonded to the base material. The flame-resistant or flame-retardant material can be a phenolic resin, a phenolic/epoxy composite, NOMEX, an organohalogen compound (e.g. chlorendic acid derivative, chlorinated paraffin, decabromodiphenyl ether, decabromodiphenyl ethane, brominated polystyrene, brominated carbonate oligomer, brominated epoxy oligomer, tetrabromophthalic anyhydride, tetrabromobisphenol A, or hexabromocyclododecane), an organophosphorus compound (e.g. triphenyl phosphate, resorcinol bis(diphenylphosphate), bisphenol A diphenyl phosphate, tricresyl phosphate, dimethyl methylphosphonate, aluminum diethyl phosphinate, brominated tris, chlorinated tris, or tetrekis(2-chloroethyl)dichloroisopentyldiphosphate, antimony trioxide, or sodium antimonite), or a mineral (e.g. aluminium hydroxide, magnesium hydroxide, huntite, hydromagnesite, red phosphorus, or zinc borate).

The protective cover 1105, along with the stack of ballistic sheets 1005, can be heated and subjected to a vacuum bagging process, thereby partially or fully bonding an inner surface of the cover to the stack of ballistic sheets 1005 encased by the cover. Full or partial bonding can prevent the stack of ballistic sheets 1005 from shifting within the cover 1105 during use, which can be important to ensure that ballistic performance of the panel 100 is maintained. The cover 1105 can include a temperature sensitive adhesive or a layer of resin on an inner surface. The cover 1105 can be heated to promote full or partial bonding of the inner surface of the cover to the stack of ballistic sheets 1005 due to the adhesive or resin. In one example, the cover can be made of a material that is coated with polyurethane, polypropylene, vinyl, polyethylene, or a combination thereof, on the inner surface the cover. Heating the cover 1105 to a temperature above the melting point of the adhesive or resin and then cooling the cover below the melting point of the adhesive or resin can result in bonding of the inner surface of the cover to the outer surface of the stack of ballistic sheets 1005.

In some examples, the protective cover 1105 can be made of ripstop NYLON coated with polyurethane. The cover 1105 can be made of ripstop NYLON with a polyurethane coating that is about 0.1-1.5, 0.1-0.75, 0.1-0.5, or 0.25 mil thick. The cover 1105 can be made of 70-denier ripstop NYLON with a polyurethane coating that is about 0.1-1.5, 0.1-0.75, 0.1-0.5, or 0.25 mil thick. The polyurethane coating can be provided on an inner surface of the cover 1105. A durable water repellant finish can be provided on an outer surface of the cover 1105. Suitable polyurethane coated ripstop NYLON materials are commercially available under the trademark X-PAC from Rockywoods Fabrics, LLC located in Loveland, Colo.

Vacuum Bagging

Figure 9:
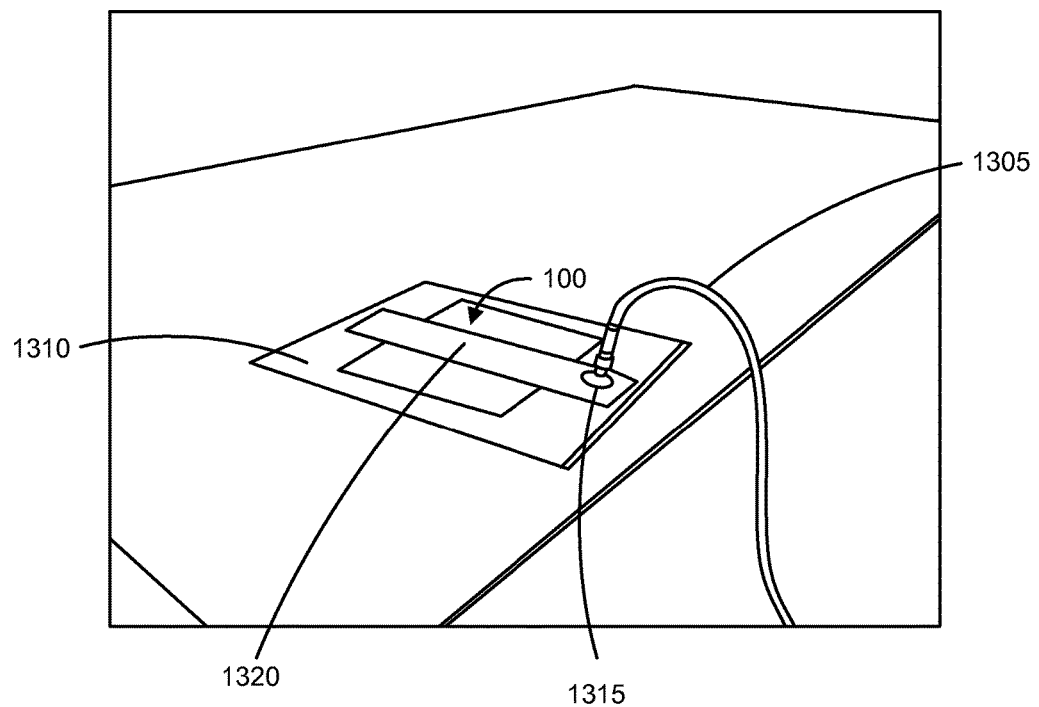
FIG. 9 shows a vacuum bagging process employing a vacuum bag sized to accommodate one flexible ballistic resistant panel.

The stack of ballistic sheets 1005 can be vacuum bagged to remove air that is present between adjacent sheets (e.g. 25), thereby compressing the stack and reducing its thickness. During the vacuum bagging process, a stack of ballistic sheets 1005 are inserted into a vacuum bag, which is then sealed, as shown in FIG. 9. A vacuum hose 1305 extending from a vacuum pump is then connected to a vacuum port 1315 on the vacuum bag 1310, and the vacuum pump is activated to effectively evacuate air from the vacuum bag through the vacuum hose. A breather layer 1320 can be positioned between the panel 100 and the vacuum bag 1310 to ensure uniform evacuation of the vacuum bag. As air is evacuated from the vacuum bag 1310, the air pressure inside the bag decreases. Meanwhile, the ambient air pressure acting on the outside of the vacuum bag 1310 remains at atmospheric pressure (e.g. ~14.7 psi). The pressure differential between the air pressure inside and outside the bag is sufficient to produce a suitable compressive force against the stack of ballistic sheets 1005 within the panel 100. The compressive force is applied uniformly over the panel 100, thereby resulting in a panel with uniform or nearly uniform thickness.

Figure 8:
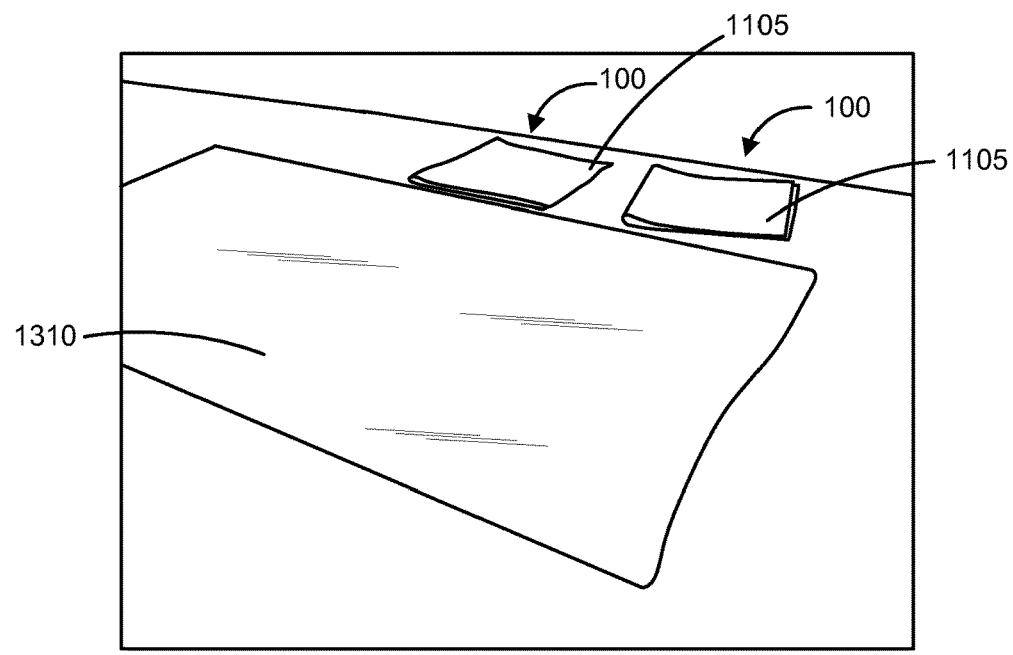
FIG. 8 shows two stacks of ballistic resistant sheets, each wrapped in a waterproof cover and ready for insertion into a vacuum bag sized to accommodate several flexible ballistic resistant panels during a vacuum bagging process.

In one example, the vacuum bag 1310 can be sized to accommodate one ballistic panel 100, as shown in FIG. 9. In another example, the vacuum bag 1310 can be sized to accommodate a plurality of ballistic panels 100, as shown in FIG. 8. For instance, the vacuum bag can be sized to accommodate two or more, 2-20, 4-12, or 6-10 ballistic panels. Vacuum bagging batches of ballistic panels 100 can be more efficient than vacuum bagging individual panels, as shown in FIG. 9. Vacuum bagging batches of panels 100 also allows for quality testing of at least one panel per batch. Quality control testing of a panel 100 may involve destructive testing, such as firing projectiles at the panel to determine a V50 rating or a ballistic protection level. Therefore, it is desirable to make two or more panels in an identical vacuum bagging process, where it can be assumed that the panels that are not destructively tested will perform similarly to the panel that has been destructively tested.

The vacuum bag used in the vacuum bagging process can be reusable, which can reduce consumables and decrease labor costs. The reusable vacuum bag can be made from any suitable material, such as LEXAN, silicone rubber, TEFLON, fiberglass reinforced polyurethane, fiberglass reinforced polyester, or KEVLAR reinforced rubber.

Heating Process

Figure 6:
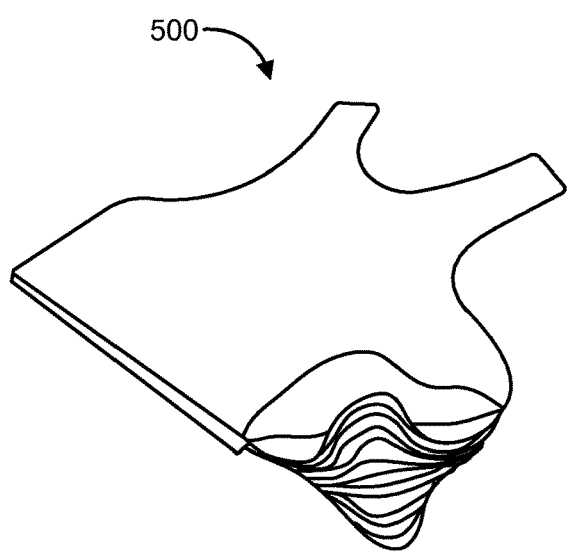
FIG. 6 shows a prior art bullet-proof vest with an edge seam undone to expose a stack of ballistic sheets fanned out with no partial or full bonding between adjacent sheets.

During formation of the ballistic resistant panel 100, the stack of ballistic sheets 1005 can be heated in a heating process. Heating can promote bonding (e.g. partial or full bonding) between adjacent ballistic sheets. When adjacent ballistic sheets are fully (i.e. completely) bonded, it may be difficult or nearly impossible to separate the sheets by hand, since former boundaries between adjacent sheets may no longer exist due to various degrees of melting. When adjacent sheets are partially bonded, it may still be possible to separate adjacent sheets by hand, depending on the extent of the partial bonding. Full or partial bonding is desirable since it can enhance the panel's ability to dissipate impact energy of a projectile that strikes the panel as the ballistic sheets within the panel experience delamination. During delamination, adjacent ballistic sheets that were partially or fully bonded prior to impact are separated (i.e. delaminated) in response to the projectile entering the panel, and the energy required to separate those ballistic sheets is dissipated from the projectile, thereby reducing the speed of the projectile and eventually stopping and capturing the projectile. A panel 100 containing ballistic sheets that are partially or fully bonded can more effectively dissipate impact energy from a projectile than a panel that has no bonding and is simply a stack of ballistic sheets sewn together, such as the ballistic sheets shown in the prior art bullet-proof vest in FIG. 6. The ballistic sheets in FIG. 6 have no partial or full bonding between adjacent layers, which is evident from the way the ballistic sheets can easily be fanned out after an edge seam is undone. For this reason, the bullet-proof vest in FIG. 6 is unable to match the ballistic performance of the panels 100 described herein.

In one example, heating of the stack of ballistic sheets 1005 can occur after the stack has been vacuum bagged and while the stack is still sealed within the vacuum bag 1310. In another example, the stack of ballistic sheets 1005 can be heated after vacuum bagging and after the stack has been removed from the vacuum bag 1310. In yet another example, heating can occur before the stack of ballistic sheets 1005 has been subjected to a vacuum bagging process.

Heating can occur using any suitable heating equipment such as, for example, a conventional oven, infrared oven, hydroclave, or autoclave. To ensure accurate temperature control throughout the heating process, the heating equipment can include a closed-loop controller, such as a proportional-integral-derivative (PID) controller. To avoid temperature variations throughout a heating chamber of the heating equipment, a fan can be installed and operated within the heating chamber. The fan can circulate air throughout the heating chamber, thereby encouraging mixing of higher and lower temperature regions that may form within the heating chamber (due, for example, to placement of a heating element), and attempting to produce a uniform (or nearly uniform) air temperature adjacent to all outer surfaces of the panel 100 to ensure consistent behavior of the resins in the ballistic sheets. In some examples, the heating chamber can be located within, or can be the same apparatus as, the pressure vessel described herein.

During the heating process, a process temperature can be selected based, at least in part, on a melting point of one or more resins that are incorporated into one or more of the ballistic sheets (e.g. 25) in the stack. For instance, if the stack includes a ballistic sheet containing a thermoplastic polymer resin (e.g. a polyethylene resin) with a melting temperature of about 215-240 degrees F., the process temperature can be increased to about 200-240 degrees F. or beyond to promote softening or melting of the resin in the ballistic sheet. Similarly, if the stack includes a ballistic sheet containing a thermoplastic polymer resin (e.g. a polypropylene resin) with a melting temperature of about 255-295 or 295-330 degrees F., the process temperature can be increased to about 240-295 or about 280-330 degrees F. or beyond to promote softening or melting of the resin in the ballistic sheet.

As noted herein, the panel 100 can include a stack of ballistic sheets 1005 including at least a first plurality of ballistic sheets and a second plurality of ballistic sheets. The first plurality of ballistic sheets can include a first thermoplastic polymer (i.e. first resin) having a first melting point, and the second plurality of ballistic sheets can include a second thermoplastic polymer (i.e. second resin) having a second melting point. The second melting point can be higher than the first melting point. In one example, during the heating process, it can be desirable to heat the panel to a temperature between the first and second melting points, thereby causing melting of the first thermoplastic polymer and resulting in bonding (e.g. partial or full bonding) of each sheet in the first plurality of ballistic sheets to an adjacent sheet. Since the process temperature remains below the second melting point, the second thermoplastic polymer will not melt and the second plurality of ballistic sheets may not undergo any bonding, thereby permitting flexibility of the panel to remain relatively high since the ballistic sheets in the second plurality of ballistic sheets are permitted to move relative to one another when the panel is flexed.

In one example, where the first melting point of the first resin in the first plurality of the ballistic sheets is about 215-240 degrees F. and the second melting point of the second resin in the second plurality of ballistic sheets is about 295-330 degrees F., the process temperature can be about 250-275 or 265-275 degrees F. for at least 15 minutes or for about 60 minutes or more. In another example, where the first melting point of the first resin in the first plurality of the ballistic sheets is about 215-240 degrees F. and the second melting point of the second resin in the second plurality of ballistic sheets is about 255-295 degrees F., the process temperature can be about 200-240 degrees F. for at least 15 minutes or for about 60 minutes or more.

To promote partial or full bonding of adjacent ballistic sheets in the stack, the stack can be heated to a suitable temperature for a suitable duration. Suitable temperatures and durations may depend on the types of resin or resins present in the one or more ballistic sheets in the stack. Examples of suitable process temperatures and durations for a heating process for any of the various stacks of ballistic sheets described herein can include: 200-550 degrees F. for at least 1 second; 200-550 degrees F. for at least 5 minutes; 200-550 degrees F. for at least 15 minutes; 200-550 degrees F. for at least 30 minutes; 200-550 degrees F. for at least 60 minutes; 200-550 degrees F. for at least 90 minutes; 200-550 degrees F. for at least 120 minutes; 200-550 degrees F. for at least 180 minutes; 200-550 degrees F. for at least 240 minutes; 200-550 degrees F. for at least 480 minutes; 225-350 degrees F. for at least 1 second; 225-350 degrees F. for at least 5 minutes; 225-350 degrees F. for at least 15 minutes; 225-350 degrees F. for at least 30 minutes; 225-350 degrees F. for at least 60 minutes; 225-350 degrees F. for at least 90 minutes; 225-350 degrees F. for at least 120 minutes; 225-350 degrees F. for at least 180 minutes; 225-350 degrees F. for at least 240 minutes; 250-350 degrees F. for at least 1 second; 250-350 degrees F. for at least 5 minutes; 250-350 degrees F. for at least 15 minutes; 250-350 degrees F. for at least 30 minutes; 250-350 degrees F. for at least 60 minutes; 250-350 degrees F. for at least 90 minutes; 250-350 degrees F. for at least 120 minutes; 250-350 degrees F. for at least 180 minutes; 250-350 degrees F. for at least 240 minutes; 250-300 degrees F. for at least 1 second; 250-300 degrees F. for at least 5 minutes; 250-300 degrees F. for at least 15 minutes; 250-350 degrees F. for at least 30 minutes; 250-300 degrees F. for at least 60 minutes; 250-350 degrees F. for at least 90 minutes; 250-300 degrees F. for at least 120 minutes; 250-300 degrees F. for at least 180 minutes; 250-300 degrees F. for at least 240 minutes; 250-275 degrees F. for at least 1 second; 250-275 degrees F. for at least 5 minutes; 250-275 degrees F. for at least 15 minutes; 250-275 degrees F. for at least 30 minutes; 250-275 degrees F. for at least 60 minutes; 250-275 degrees F. for at least 90 minutes; 250-275 degrees F. for at least 120 minutes; 250-275 degrees F. for at least 180 minutes; 250-275 degrees F. for at least 240 minutes; 265-275 degrees F. for at least 1 second; 265-275 degrees F. for at least 5 minutes; 250-275 degrees F. for at least 15 minutes; 265-275 degrees F. for at least 30 minutes; 265-275 degrees F. for at least 60 minutes; 265-275 degrees F. for at least 90 minutes; 265-275 degrees F. for at least 120 minutes; 265-275 degrees F. for at least 180 minutes; 265-275 degrees F. for at least 240 minutes; 225-250 degrees F. for at least 1 second; 225-250 degrees F. for at least 5 minutes; 225-250 degrees F. for at least 15 minutes; 225-250 degrees F. for at least 30 minutes; 225-250 degrees F. for at least 60 minutes; 225-250 degrees F. for at least 90 minutes; 225-250 degrees F. for at least 120 minutes; 225-250 degrees F. for at least 180 minutes; 225-250 degrees F. for at least 240 minutes; 200-240 degrees F. for at least 1 second; 200-240 degrees F. for at least 5 minutes; 200-240 degrees F. for at least 15 minutes; 200-240 degrees F. for at least 30 minutes; 200-240 degrees F. for at least 60 minutes; 200-240 degrees F. for at least 90 minutes; 200-240 degrees F. for at least 120 minutes; 200-240 degrees F. for at least 180 minutes; or 200-240 degrees F. for at least 240 minutes.

For any of the above-mentioned process temperatures and durations for a heating process, the stack of ballistic sheets 1005 may be sealed within a vacuum bag 1310 during the heating process. In certain examples, a vacuum hose 1305 extending from a vacuum pump can remain connected to a vacuum port 1315 on the vacuum bag 1310 during the heating process, thereby providing a compressive force against the panel 100 during the heating process. This configuration can ensure good results even if the vacuum bag 1310 is not perfectly sealed due to, for example, minor leaks in the bag material or sealant.

Exposing the panel to a higher temperature during the heating process can effectively reduce cycle times, which is desirable for mass production. Due to the thickness of the panel and heat transfer properties of the panel, exposing the panel to a high temperature (e.g. 500 degrees F.) for a relatively short duration may allow the inner portion of the panel to achieve a target temperature needed for bonding (e.g. 250-275 degrees F.) more quickly than if the heat source was initially set to the target temperature needed for bonding.

Applying Pressure

During formation of the ballistic resistant panel 100, pressure can be applied to the stack of ballistic sheets 1005.

Pressure can promote partial or full bonding of adjacent ballistic sheets (e.g. 25) in the stack 1005. Pressure can be applied to the stack of ballistic sheets 1005 using a press (e.g. mechanical pressure), autoclave (e.g. air pressure), hydroclave, bladder press, or other suitable device. In one example, pressure can be applied to the stack of ballistic sheets 1005 during the heating process. In another example, pressure can be applied to the stack of ballistic sheets prior to the heating process. In yet another example, pressure can be applied to the stack of ballistic sheets after the heating process, but while the stack of ballistic sheets is still at an elevated temperature. If pressure is applied to the stack of ballistic sheets, it can occur after the stack of ballistic sheets 1005 has been vacuum bagged and while the stack is still residing inside the vacuum bag 1310 and being heated. Alternately, pressure can be applied to the stack of ballistic sheets 1005 after the stack has been removed from the vacuum bag 1310 or before the stack is inserted into the vacuum bag.

During a process involving both heat and pressure, a process temperature can be selected based on a melting point of one or more thermoplastic polymers (i.e. resins) that are incorporated into one or more of the ballistic sheets in the stack 1005. For instance, if the stack 1005 includes a ballistic sheet (e.g. 25) containing a first resin with a melting temperature of about 215-240 degrees F., the process temperature can be increased to about 200-240 degrees F. or beyond to promote softening or melting of the first resin in the stack. Similarly, if the stack 1005 includes a ballistic sheet containing a second resin with a melting temperature near 255-295 or 295-330 degrees F., the process temperature can be increased to about 240-295 or 280-330 degrees F. or beyond to promote softening or melting of the second resin in the stack.

To promote partial or full bonding of adjacent ballistic sheets (e.g. 25) in the stack 1005, a suitable pressure can be applied to the stack for a suitable duration. Suitable pressures and durations may depend on the types of resin or resins present in the one or more ballistic sheets in the stack. Examples of suitable process pressures and durations for any of the various stacks of ballistic sheets 1005 described herein can include: 10-100 psi for at least 1 second, 10-100 psi for at least 1 second; 10-100 psi for at least 5 minutes; 10-100 psi for at least 15 minutes; 10-100 psi for at least 30 minutes; 10-100 psi for at least 60 minutes; 10-100 psi for at least 90 minutes; 10-100 psi for at least 120 minutes; 10-100 psi for at least 180 minutes; 10-100 psi for at least 240 minutes; 50-75 psi for at least 1 second; 50-75 psi for at least 5 minutes; 50-75 psi for at least 15 minutes; 50-75 psi for at least 30 minutes; 50-75 psi for at least 60 minutes; 50-75 psi for at least 90 minutes; 50-75 psi for at least 120 minutes; 50-75 psi for at least 180 minutes; 50-75 psi for at least 240 minutes; 75-100 psi for at least 1 second; 75-100 psi for at least 5 minutes; 75-100 psi for at least 15 minutes; 75-100 psi for at least 30 minutes; 75-100 psi for at least 60 minutes; 75-100 psi for at least 90 minutes; 75-100 psi for at least 120 minutes; 75-100 psi for at least 180 minutes; 75-100 psi for at least 240 minutes; at least 10 psi for at least 1 second; at least 10 psi for at least 5 minutes; at least 10 psi for at least 15 minutes; at least 10 psi for at least 30 minutes; at least 10 psi for at least 60 minutes; at least 10 psi for at least 90 minutes; at least 10 psi for at least 120 minutes; at least 10 psi for at least 180 minutes; at least 10 psi for at least 240 minutes; at least 100 psi for at least 1 second; at least 100 psi for at least 5 minutes; at least 100 psi for at least 15 minutes; at least 100 psi for at least 30 minutes; at least 100 psi for at least 60 minutes; at least 100 psi for at least 90 minutes; at least 100 psi for at least 120 minutes; at least 100 psi for at least 180 minutes; or at least 100 psi for at least 240 minutes.

Lower pressures may be achievable with, for example, a manual press or a small autoclave. In other examples, higher pressures can be applied to the stack of ballistic sheets with, for example, an industrial autoclave, hydroclave, bladder press (e.g. made of KEVLAR reinforced rubber), a pneumatic press, or a hydraulic press. To promote partial or full bonding of adjacent ballistic sheets in the stack, a suitable pressure can be applied to the stack for a suitable duration or only momentarily. Suitable pressures and durations may depend on the types of resin or resins present in the one or more ballistic sheets in the stack. Examples of suitable process pressures and durations for any of the various stacks of ballistic sheets described herein can include: 100-500 psi for at least 1 second; 100-500 psi for at least 5 minutes; 100-500 psi for at least 15 minutes; 100-500 psi for at least 30 minutes; 100-500 psi for at least 60 minutes; 100-500 psi for at least 90 minutes; 100-500 psi for at least 120 minutes; 100-500 psi for at least 180 minutes; 100-500 psi for at least 240 minutes; 500-1,000 psi for at least 1 second; 500-1,000 psi for at least 5 minutes; 500-1,000 psi for at least 15 minutes; 500-1,000 psi for at least 30 minutes; 500-1,000 psi for at least 60 minutes; 500-1,000 psi for at least 90 minutes; 500-1,000 psi for at least 120 minutes; 500-1,000 psi for at least 180 minutes; 500-1,000 psi for at least 240 minutes; 1,000-2,500 psi for at least 1 second; 1,000-2,500 psi for at least 5 minutes; 1,000-2,500 psi for at least 15 minutes; 1,000-2,500 psi for at least 30 minutes; 1,000-2,500 psi for at least 60 minutes; 1,000-2,500 psi for at least 90 minutes; 1,000-2,500 psi for at least 120 minutes; 1,000-2,500 psi for at least 180 minutes; 1,000-2,500 psi for at least 240 minutes; at least 2,500 psi for at least 1 second; at least 2,500 psi for at least 5 minutes; at least 2,500 psi for at least 15 minutes; at least 2,500 psi for at least 30 minutes; at least 2,500 psi for at least 60 minutes; at least 2,500 psi for at least 90 minutes; at least 2,500 psi for at least 120 minutes; at least 2,500 psi for at least 180 minutes; or at least 2,500 psi for at least 240 minutes.

Combination of Heat and Pressure

If a process for manufacturing a ballistic panel 100 requires heat and pressure, heat and pressure can be applied simultaneously to reduce the overall cycle time required to manufacture the panel. An autoclave can facilitate these combined processes. An autoclave is a pressure vessel that can be used to apply pressure and heat to one or more ballistic panels 100 during a manufacturing process. If pressure is applied during the heating process, the process temperature can be modified to account for the effect that pressure has on the melting point of the one or more resins that are incorporated in one or more of the ballistic sheets in the stack 1005. For instance, if the melting point of the resin increases as pressure increases, the target process temperature for the heating process can be increased when the heating process occurs in conjunction with the pressure process to ensure melting of the resin.

3-Dimensional Forming Process

During a forming process, a mold can be used to transform a flat ballistic resistant panel 100 into any suitable 3-dimensional shape. In one example, the forming process can occur concurrently with the vacuum bagging process. In another example, pressure, such as air pressure within an autoclave, can be used to form the ballistic resistant panel into any suitable 3-dimensional shape while the panel 100 is still in the vacuum bag 1310. In yet another example, pressure, such as air pressure within an autoclave, and heat can be used to form the ballistic resistant panel 100 into any suitable 3-dimensional shape while the panel 100 is still in the vacuum bag 1310. In still another example, the panel 100 may be inserted into a mold while still at an elevated temperature following the heating process, and a press can be used to conform the panel to the shape of the mold.

Heat Sealing

As discussed above, the stack of ballistic sheets 1005 can be encased in a protective cover 1105. The outer perimeter of the cover 1105 can be heat-sealed to prevent water ingress. Heat sealing is a process where one material is joined to another material (e.g. one thermoplastic is joined to another thermoplastic) using heat and pressure. During the heat sealing process, a heated die or sealing bar can apply heat and pressure to a specific contact area or path to seal or join two materials together. When heat-sealing the perimeter of the cover, the presence of a thermoplastic material proximate the contact area can promote sealing in the presence of heat and pressure. In one example, the cover 1105 can include thermoplastic polyurethane proximate the contact area to permit heat sealing. The cover 1105 can be made of a first portion and a second portion, and the heat sealing process can be used to join the first portion to the second portion, thereby encapsulating the stack of ballistic sheets 1005 in a waterproof enclosure.

Cooling

After the stack of ballistic sheets 1005 has been heated to a predetermined temperature for a predetermined duration, the stack can be cooled. In one example, the cooling process can occur while the stack of ballistic sheets is outside of the vacuum bag 1310. In another example, the cooling process can occur while the stack of ballistic sheets 1005 is inside the vacuum bag with vacuum applied. During the cooling process, the temperature of the stack of ballistic sheets 1005 can be reduced from the predetermined temperature to about room temperature. Cooling can occur through natural convection, forced convection, liquid cooling, or any other suitable cooling process. If liquid cooling is employed, a suitable spray cooling process can be employed. Alternately, the stack of ballistic sheets 1005 encased in the waterproof cover 1105 can be submerged in a water bath. The water bath can be connected to a heat exchanger and a circulating pump to increase the rate of cooling.

Break-in Process

Figure 5:
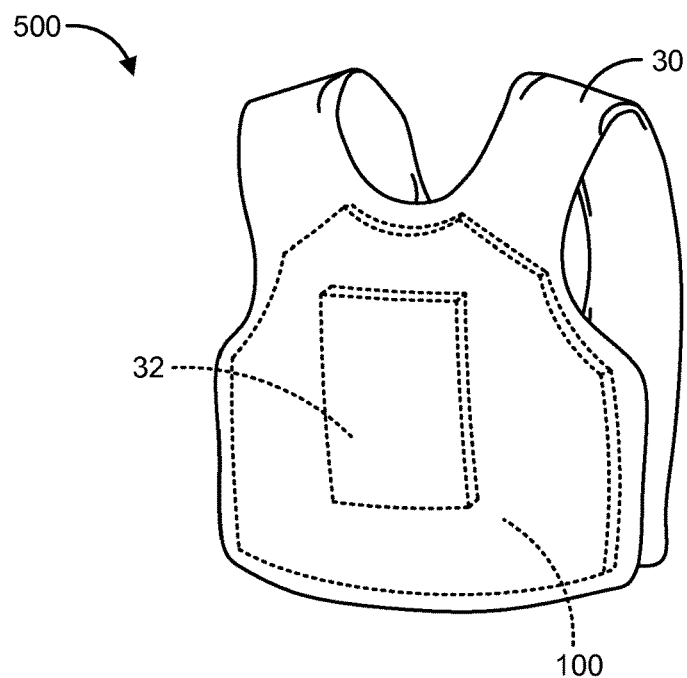
FIG. 5 shows a carrier vest with a pouch containing a flexible ballistic-resistant panel (e.g. soft armor) positioned behind a rigid or semi-rigid ballistic resistant member (e.g. hard armor).

For certain applications, it is desirable to manufacture a ballistic panel 100 that is relatively flexible. For instance, when the panel is intended for use in a personal garment, such as a bullet-proof vest 30 as shown in FIG. 5, it can be desirable to use a flexible panel 100 that provides the wearer greater mobility. Panels that are relatively flexible are generally referred to as "soft armor," whereas panels that are relatively rigid, such as a steel or ceramic plate 32 shown in FIG. 5 are generally referred to as "hard armor." To further improve the flexibility of the soft armor panels described herein, the panels can be subjected to a break-in process. The break-in process can be accomplished by hand or by mechanical devices. Mechanical devices can be used to speed the break-in process and to provide greater consistency among a series of panels, thereby improving quality control and ensuring consistent panel performance. In one example, a series of rollers can be configured to receive the flexible panel 100. As the panel 100 passes through a first set of rollers, the panel may be deformed in a first direction to transform the nearly flat panel to a curved panel. Due to the resilience of the stack of ballistic sheets, the panel 100 may return to a nearly flat panel shortly after exiting the first set of rollers. The panel 100 may then pass through a second set of rollers configured to deform the panel in a second direction that is opposite the first direction. Once again, due to the resilience of the stack of ballistic sheets, the panel may return to a nearly flat panel shortly after exiting the second set of rollers. To further enhance the flexibility of the panel, the panel may be fed through the first and second rollers one or more additional times.

Methods or Cutting Ballistic Sheets

The intended use of the ballistic panel 100 will affect the size and shape of the panel, and the size and shape of the panel will dictate the geometry of a pattern (e.g. two-dimensional pattern) that is cut from the ballistic sheet 25. The intended use of the panel will also dictate how many ballistic sheets should be included in the panel to satisfy certain performance standards, such as those set forth in NIJ Standard-0101.06.

In one example, ballistic sheets 25 can be cut from large rolls of ballistic sheet material. Due to the size of the sheets, it is common for one or more patterns be cut from a single ballistic sheet. The patterns can be arranged on the ballistic sheet to minimize the amount of ballistic sheet material that is wasted. In one example, a computer program can be used to determine an arrangement of patterns that minimizes the amount of wasted ballistic sheet material.

The ballistic sheets 25 can be cut on a cutting table, such as a model M9000 manufactured by Eastman Machine Company of Buffalo, N.Y. The top surface of the cutting table can include a plurality of holes. The cutting table can be connected to a vacuum pump that applies suction to a lower side of the top surface, thereby drawing air through the plurality of holes and creating suction proximate the top surface of the cutting table. During cutting, the ballistic material can be placed on the cutting table. The suction can assist in preventing movement of the ballistic sheet relative to the cutting table during the cutting process, which can improve cutting performance and precision and reduce the quantity of wasted material. Employing a cutting table with a vacuum system can reduce fraying of fibers at a cutting location by avoiding unwanted movement of the ballistic sheet during the cutting process.

The top surface of the cutting table can be made of any suitable material. In one example, the top surface of the cutting table can be made of POREX, a porous polymer material. POREX can be costly to replace if damaged by a cutting process or through misuse. A less expensive polymer sheet can be used to cover and protect the POREX. For instance, a LEXAN sheet can be used to cover and protect the POREX surface. The LEXAN sheet can include a plurality of holes that permit air to pass through the sheet and allow suction to be created proximate a top surface of the LEXAN sheet. If the LEXAN sheet is damaged during a cutting process, it can be replaced at a much lower cost than POREX. Due to its machinability, the LEXAN sheet can permit an operator to easily drill or create any suitable hole pattern in the LEXAN sheet. The number, size, or configuration of the plurality holes can vary depending on the pattern to be cut from the ballistic sheet. This provides the operator with additional process flexibility that can enhance cutting performance (e.g. the LEXAN sheet can be modified to intentionally cover and obstruct certain pores in the POREX, thereby increasing the suction proximate the remaining unobstructed pores). If the operator is cutting two patterns on the same cutting table in a single day, the operator can have two LEXAN sheets that are each optimized for cutting one of the two patterns. For instance, a first LEXAN sheet can have a number, size, and configuration of holes that is optimized for a first pattern, and a second LEXAN sheet can have a number, size, and configuration of holes that is optimized for a second pattern.

Methods for Cutting a Plurality of Ballistic Sheets

To increase efficiency, it can be desirable to cut a pattern from two or more ballistic sheets simultaneously. This can be accomplished by stacking two or more ballistic sheets prior to cutting the sheets. Cutting can be accomplished on a cutting table with any suitable cutting tool, such as a laser, blade, rotary knife, or die cutter. In one example the cutting tool can be a drag knife mounted to a computer controlled gantry. When a drag knife is used, a downward cutting force from the drag knife is applied against the stack of ballistic sheets and, in turn, against the top surface of the cutting table (or LEXAN sheet covering the cutting table).

If two or more types of ballistic sheets are being cut simultaneously in a stack, the resulting cut quality of each ballistic sheet can depend on the arrangement of the ballistic sheets within the stack. Certain types of ballistic sheets that are less stiff exhibit poor cut quality if placed on top of the stack. For instance, ballistic sheets that are less stiff may suffer poor cut quality, such as fraying along their edges or fibers pulling from the sheets by the drag knife, which can compromise the ballistic performance of the sheets.

However, it has been discovered through experimentation that bounding ballistic sheets that are less stiff with ballistic sheets that are stiffer can provide better cut quality along an edge of the less stiff ballistic sheet and produce significantly less fraying or pulling of fibers at the edge of the less stiff ballistic sheet. In one example, a grouping of one or more ballistic sheets that are less stiff can be bounded on a top surface by a grouping of one or more ballistic sheets that are stiffer. Specifically, a stack of ballistic sheets that is suitable for cutting on a cutting table can include a first grouping of one or more stiffer ballistic sheets on top of a second grouping of one or more less stiff ballistic sheets. In another example, a grouping of one or more ballistic sheets that are less stiff can be bounded on a top surface and a bottom surface by grouping of one or more ballistic sheets that are stiffer. Specifically, a stack of ballistic sheets that is suitable for cutting on a cutting table can include a first grouping of one or more stiffer ballistic sheets, a second grouping of one or more less stiff ballistic sheets, and a third grouping of one or more stiffer ballistic sheets.

The flexibility of commercially available ballistic sheets varies. In relative terms, K-FLEX ballistic sheets can be less stiff than THERMOBALLISTIC ballistic sheets. K-FLEX ballistic sheets can have a stiffness similar to fabric used for garments, whereas THERMOBALLISTIC ballistic sheets can have a stiffness similar to a paper business card. When cutting one or more K-FLEX ballistic sheets, cutting performance can be enhanced by grouping the one or more K-FLEX ballistic sheets with one or more THERMOBALLISTIC ballistic sheets, where the one or more THERMOBALLISTIC ballistic sheets are either on a top side only or on both a top and bottom side of the one or more K-FLEX ballistic sheets. These groupings of ballistic sheets can provide cleaner cuts with less fraying along edges of the K-FLEX ballistic sheets. Reducing fraying along edges of the cut sheets can help ensure that the performance of the sheets is not degraded and, ultimately, that the resulting ballistic panel 100 performs as intended.

Examples of stacks of ballistic sheets suitable for cutting on a cutting table include the following configurations, where the first listed grouping in each stack is in closest proximity to the top surface of the cutting table, and the last listed grouping in each stack is farthest from the top surface of the cutting table: 1-6 THERMOBALLISTIC 0/90 x-ply ballistic sheets, 1-10 K-FLEX 0/90 x-ply ballistic sheets, 1-6 THERMOBALLISTIC 0/90 x-ply ballistic sheets; 1-5 THERMOBALLISTIC 0/90 x-ply ballistic sheets, 1-10 K-FLEX 0/90 x-ply ballistic sheets, 1-5 THERMOBALLISTIC 0/90 x-ply ballistic sheets; 1-4 THERMOBALLISTIC 0/90 x-ply ballistic sheets, 1-10 K-FLEX 0/90 x-ply ballistic sheets, 1-4 THERMOBALLISTIC 0/90 x-ply ballistic sheets; 1-3 THERMOBALLISTIC 0/90 x-ply ballistic sheets, 1-10 K-FLEX 0/90 x-ply ballistic sheets, 1-3 THERMOBALLISTIC 0/90 x-ply ballistic sheets; 1-2 THERMOBALLISTIC 0/90 x-ply ballistic sheets, 1-10 K-FLEX 0/90 x-ply ballistic sheets, 1-2 THERMOBALLISTIC 0/90 x-ply ballistic sheets; 1 THERMOBALLISTIC 0/90 x-ply ballistic sheets, 1-10 K-FLEX 0/90 x-ply ballistic sheets, 1 THERMOBALLISTIC 0/90 x-ply ballistic sheets; 6 THERMOBALLISTIC 0/90 x-ply ballistic sheets, 10 K-FLEX 0/90 x-ply ballistic sheets, 6 THERMOBALLISTIC 0/90 x-ply ballistic sheets; 6 THERMOBALLISTIC 0/90 x-ply ballistic sheets, 8 K-FLEX 0/90 x-ply ballistic sheets, 6 THERMOBALLISTIC 0/90 x-ply ballistic sheets; or 1 or more THERMOBALLISTIC 0/90 x-ply ballistic sheets, 1 or more K-FLEX 0/90 x-ply ballistic sheets, 1 or more THERMOBALLISTIC 0/90 x-ply ballistic sheets.

Additional examples of stacks of ballistic sheets suitable for cutting on a cutting table are provided below, where a first plurality of ballistic sheets (e.g. one or more K-FLEX 0/90 x-ply ballistic sheets) are bounded by a second plurality of ballistic sheets (e.g. one or more THERMOBALLISTIC 0/90 x-ply ballistic sheets). In the following examples, the first listed grouping in each stack is in closest proximity to the top surface of the cutting table: 1-6 K-FLEX 0/90 x-ply ballistic sheets, 1-6 THERMOBALLISTIC 0/90 x-ply ballistic sheets; 1-4 K-FLEX 0/90 x-ply ballistic sheets, 1-6 THERMOBALLISTIC 0/90 x-ply ballistic sheets; 2-4 K-FLEX 0/90 x-ply ballistic sheets, 3-6 THERMOBALLISTIC 0/90 x-ply ballistic sheets; 3-4 K-FLEX 0/90 x-ply ballistic sheets; 4-6 THERMOBALLISTIC 0/90 x-ply ballistic sheets; 3 K-FLEX 0/90 x-ply ballistic sheets, 6 THERMOBALLISTIC 0/90 x-ply ballistic sheets; 4 K-FLEX 0/90 x-ply ballistic sheets, 6 THERMOBALLISTIC 0/90 x-ply ballistic sheets.

Homogeneous or Non-Homogeneous Stack

In one example, the ballistic sheets can be arranged in a homogeneous stack, where all ballistic sheets in the stack are made from the same type of ballistic sheet material. In other examples, any of the others suitable types of ballistic sheets (e.g. sheets made of aramid or glass fibers, sheets made of ceramic, or sheets made of metal) can be interspersed in the stack of ballistic sheet material to improve the ballistic performance of the stack. In another example, a sheet of film adhesive, such as a sheet of film adhesive available from Collano AG, located in Germany, can be interspersed in the stack of ballistic sheets to alter the ballistic performance of the stack. In particular, a sheet of adhesive film can be incorporated within the stack near a strike face side of the stack to improve stab resistance of the panel. A sheet of adhesive film can be incorporated within the stack near a wear face side of the stack to reduce back face deformation of the panel after being struck by a projectile.

Panels Constructed from X-Ply Ballistic Sheets

Two uni-ply ballistic sheets can be bonded together to produce a configuration known as x-ply. Examples of suitable stacks of x-ply ballistic sheets 1005 for a flexible ballistic resistant panel 100 can include a first plurality of x-ply ballistic sheets 1020 containing a first resin with a first melting temperature and a second plurality of x-ply ballistic sheets 1025 containing a second resin with a second melting temperature (see, e.g. FIGS. 11 and 12). The second melting temperature can be higher than the first melting temperature. Examples include: 1-10 0/90 x-ply ballistic sheets containing a first resin and 1-10 0/90 x-ply ballistic sheets containing a second resin; 4-10 0/90 x-ply ballistic sheets containing a first resin and 4-10 0/90 x-ply ballistic sheets containing a second resin; 6-10 0/90 x-ply ballistic sheets containing a first resin and 6-10 0/90 x-ply ballistic sheets containing a second resin; 10-20 0/90 x-ply ballistic sheets containing a first resin and 10-20 0/90 x-ply ballistic sheets containing a second resin; 20-30 0/90 x-ply ballistic sheets containing a first resin and 20-30 0/90 x-ply ballistic sheets containing a second resin.

Examples of suitable stacks of x-ply ballistic sheets 1005 containing aramid fibers can include a first plurality of x-ply ballistic sheets 1020 containing aramid fibers and a first resin with a first melting temperature and a second plurality of x-ply ballistic sheets 1025 containing aramid fibers and a second resin with a second melting temperature (see, e.g. FIGS. 11 and 12). The second melting temperature can be higher than the first melting temperature. Examples include: 1-10 0/90 x-ply ballistic sheets containing a first resin and 1-10 0/90 x-ply ballistic sheets containing a second resin; 4-10 0/90 x-ply ballistic sheets containing a first resin and 4-10 0/90 x-ply ballistic sheets containing a second resin; 6-10 0/90 x-ply ballistic sheets containing a first resin and 6-10 0/90 x-ply ballistic sheets containing a second resin; 10-20 0/90 x-ply ballistic sheets containing a first resin and 10-20 0/90 x-ply ballistic sheets containing a second resin; 20-30 0/90 x-ply ballistic sheets containing a first resin and 20-30 0/90 x-ply ballistic sheets containing a second resin.

Examples of suitable stacks of x-ply ballistic sheets 1005 for a flexible ballistic panel 100 can include a first plurality of x-ply ballistic sheets 1020 containing a polyethylene resin with a melting temperature of about 215-240 degrees F. and a second plurality of x-ply ballistic sheets 1025 containing a polypropylene resin with a melting temperature of about 255-295 or 295-330 F (see, e.g. FIGS. 11 and 12). Examples include: 1-10 0/90 x-ply ballistic sheets containing a polyethylene resin and 1-10 0/90 x-ply ballistic sheets containing a polypropylene resin; 4-10 0/90 x-ply ballistic sheets containing a polyethylene resin and 4-10 0/90 x-ply ballistic sheets containing a polypropylene resin; 6-10 0/90 x-ply ballistic sheets containing a polyethylene resin and 6-10 0/90 x-ply ballistic sheets containing a polypropylene resin; 10-20 0/90 x-ply ballistic sheets containing a polyethylene resin and 10-20 0/90 x-ply ballistic sheets containing a polypropylene resin; 20-30 0/90 x-ply ballistic sheets containing a polyethylene resin and 20-30 0/90 x-ply ballistic sheets containing a polypropylene resin.

Examples of suitable stacks of x-ply ballistic sheets 1005 for a flexible ballistic panel 100 can include a first plurality of THERMOBALLISTIC ballistic sheets 1025 arranged in a stack having a top surface and a bottom surface and bounded on the top surface by a first plurality of K-FLEX ballistic sheets 1020 and bounded on the bottom surface by a second plurality of K-FLEX ballistic sheets 1030, as shown in FIG. 11. Examples include: 1-10 K-FLEX 0/90 x-ply ballistic sheets, 1-10 THERMOBALLISTIC 0/90 x-ply ballistic sheets, 1-10 K-FLEX 0/90 x-ply ballistic sheets; 4-10 K-FLEX 0/90 x-ply ballistic sheets, 4-10 THERMOBALLISTIC 0/90 x-ply ballistic sheets, 4-10 K-FLEX 0/90 x-ply ballistic sheets; 6-10 K-FLEX 0/90 x-ply ballistic sheets, 6-10 THERMOBALLISTIC 0/90 x-ply ballistic sheets, 6-10 K-FLEX 0/90 x-ply ballistic sheets; 8 K-FLEX 0/90 x-ply ballistic sheets, 10 THERMOBALLISTIC 0/90 x-ply ballistic sheets, 8 K-FLEX 0/90 x-ply ballistic sheets; 6 K-FLEX 0/90 x-ply ballistic sheets, 8 THERMOBALLISTIC 0/90 x-ply ballistic sheets, 6 K-FLEX 0/90 x-ply ballistic sheets; 5 K-FLEX 0/90 x-ply ballistic sheets, 8 THERMOBALLISTIC 0/90 x-ply ballistic sheets, 5 K-FLEX 0/90 x-ply ballistic sheets; 4 K-FLEX 0/90 x-ply ballistic sheets, 8 THERMOBALLISTIC 0/90 x-ply ballistic sheets, 4 K-FLEX 0/90 x-ply ballistic sheets; 10-20 K-FLEX 0/90 x-ply ballistic sheets, 10-20 THERMOBALLISTIC 0/90 x-ply ballistic sheets, 10-20 K-FLEX 0/90 x-ply ballistic sheets; or 20-30 K-FLEX 0/90 x-ply ballistic sheets, 20-30 THERMOBALLISTIC 0/90 x-ply ballistic sheets, 20-30 K-FLEX 0/90 x-ply ballistic sheets.

Examples of suitable stacks of x-ply ballistic sheets 1005 for a flexible ballistic panel 100 can include a first plurality of K-FLEX ballistic sheets 1025 arranged in a stack having a top surface and a bottom surface and bounded on the top surface by a first plurality of THERMOBALLISTIC ballistic sheets 1020 and bounded on the bottom surface by a second plurality of THERMOBALLISTIC ballistic sheets 1030, as shown in FIG. 12. Suitable examples include: 1-10 THERMOBALLISTIC 0/90 x-ply ballistic sheets, 1-10 K-FLEX 0/90 x-ply ballistic sheets, 1-10 THERMOBALLISTIC 0/90 x-ply ballistic sheets; 4-10 THERMOBALLISTIC 0/90 x-ply ballistic sheets, 4-10 K-FLEX 0/90 x-ply ballistic sheets, 4-10 THERMOBALLISTIC 0/90 x-ply ballistic sheets; 6-10 THERMOBALLISTIC 0/90 x-ply ballistic sheets, 6-10 K-FLEX 0/90 x-ply ballistic sheets, 6-10 THERMOBALLISTIC 0/90 x-ply ballistic sheets; 8 THERMOBALLISTIC 0/90 x-ply ballistic sheets, 10 K-FLEX 0/90 x-ply ballistic sheets, 8 THERMOBALLISTIC 0/90 x-ply ballistic sheets; 6 THERMOBALLISTIC 0/90 x-ply ballistic sheets, 8 THERMOBALLISTIC 0/90 x-ply ballistic sheets, 6 THERMOBALLISTIC 0/90 x-ply ballistic sheets; 5 THERMOBALLISTIC 0/90 x-ply ballistic sheets, 8 K-FLEX 0/90 x-ply ballistic sheets, 5 THERMOBALLISTIC 0/90 x-ply ballistic sheets; 4 THERMOBALLISTIC 0/90 x-ply ballistic sheets, 8 K-FLEX 0/90 x-ply ballistic sheets, 4 THERMOBALLISTIC 0/90 x-ply ballistic sheets; 6 THERMOBALLISTIC 0/90 x-ply ballistic sheets, 6 K-FLEX 0/90 x-ply ballistic sheets, 6 THERMOBALLISTIC 0/90 x-ply ballistic sheets; 10-20 THERMOBALLISTIC 0/90 x-ply ballistic sheets, 10-20 K-FLEX 0/90 x-ply ballistic sheets, 10-20 THERMOBALLISTIC 0/90 x-ply ballistic sheets, or 20-30 THERMOBALLISTIC 0/90 x-ply ballistic sheets, 20-30 K-FLEX 0/90 x-ply ballistic sheets, 20-30 THERMOBALLISTIC 0/90 x-ply ballistic sheets.

Figure 10:
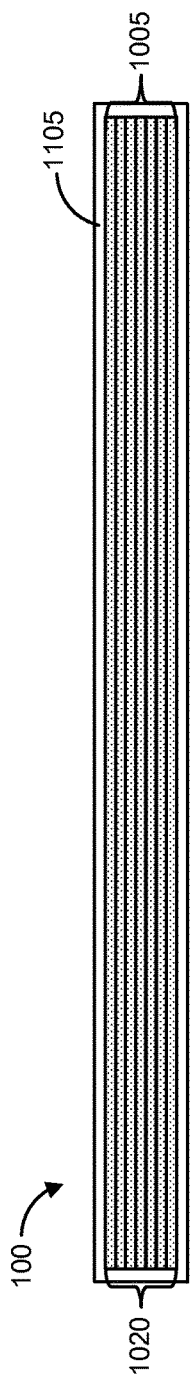
FIG. 10 is a cross-sectional side view of a flexible ballistic resistant vehicle door panel containing a plurality of ballistic sheets, each of the plurality of ballistic sheets being formed of an arrangement of fibers that defines a two-dimensional pattern, the first plurality of ballistic sheets being stacked according to the two-dimensional pattern.

Examples of suitable stacks of x-ply ballistic sheets 1005 for a ballistic panel 100 can include a grouping of 1-10, 4-10, 6-10, 10-20, or 20-30 x-ply ballistic sheets 1005 made of fibers (such as, for example, aramid fibers or UHMWPE fibers), as shown in FIG. 10. Examples of suitable stacks of x-ply ballistic sheets 1005 for a ballistic panel 100 can include a grouping of 1-10, 4-10, 6-10, 10-20, or 20-30 THERMOBALLISTIC 0/90 x-ply ballistic sheets. Other examples of suitable stacks 1005 of x-ply ballistic sheets for a ballistic panel 100 can include a grouping of 1-10, 4-10, 6-10, 10-20 or 20-30 K-FLEX 0/90 x-ply ballistic sheets.

Panels Constructed from Uni-Ply Ballistic Sheets

Examples of suitable stacks of uni-ply ballistic sheets 1005 for a flexible ballistic resistant panel 100 can include a first plurality of uni-ply ballistic sheets 1020 containing a first resin with a first melting temperature and a second plurality of uni-ply ballistic sheets 1025 containing a second resin with a second melting temperature (see, e.g. FIGS. 11 and 12). The second melting temperature can be higher than the first melting temperature. Examples include: 1-10 0/90 uni-ply ballistic sheets containing a first resin and 1-10 0/90 uni-ply ballistic sheets containing a second resin; 4-10 0/90 uni-ply ballistic sheets containing a first resin and 4-10 0/90 uni-ply ballistic sheets containing a second resin; 6-10 0/90 uni-ply ballistic sheets containing a first resin and 6-10 0/90 uni-ply ballistic sheets containing a second resin; 10-20 0/90 uni-ply ballistic sheets containing a first resin and 10-20 0/90 uni-ply ballistic sheets containing a second resin; 20-30 0/90 uni-ply ballistic sheets containing a first resin and 20-30 0/90 uni-ply ballistic sheets containing a second resin.

Examples of suitable stacks of uni-ply ballistic sheets containing aramid fibers can include a first plurality of uni-ply ballistic sheets 1020 containing aramid fibers and a first resin with a first melting temperature and a second plurality of uni-ply ballistic sheets 1025 containing aramid fibers and a second resin with a second melting temperature (see, e.g. FIGS. 11 and 12). The second melting temperature can be higher than the first melting temperature. Examples include: 1-10 uni-ply ballistic sheets containing a first resin and 1-10 uni-ply ballistic sheets containing a second resin; 8-20 uni-ply ballistic sheets containing a first resin and 8-20 uni-ply ballistic sheets containing a second resin; 12-20 uni-ply ballistic sheets containing a first resin and 12-20 uni-ply ballistic sheets containing a second resin; 20-40 uni-ply ballistic sheets containing a first resin and 20-40 uni-ply ballistic sheets containing a second resin; 40-60 uni-ply ballistic sheets containing a first resin and 40-60 uni-ply ballistic sheets containing a second resin.

Examples of suitable stacks of uni-ply ballistic sheets 1005 for flexible ballistic resistant panels 100 can include a first plurality of uni-ply ballistic sheets 1020 containing a polyethylene resin with a melting temperature of about 215-240 degrees F. and a second plurality of uni-ply ballistic sheets 1025 containing a polypropylene resin with a melting temperature of about 255-295 or 295-330 F (see, e.g. FIGS. 11 and 12). Examples include: 1-10 uni-ply ballistic sheets containing a polyethylene resin and 1-10 0/90 uni-ply ballistic sheets containing a polypropylene resin; 8-20 uni-ply ballistic sheets containing a polyethylene resin and 8-20 uni-ply ballistic sheets containing a polypropylene resin; 12-20 uni-ply ballistic sheets containing a polyethylene resin and 12-20 uni-ply ballistic sheets containing a polypropylene resin; 20-40 uni-ply ballistic sheets containing a polyethylene resin and 20-40 uni-ply ballistic sheets containing a polypropylene resin; 40-60 uni-ply ballistic sheets containing a polyethylene resin and 40-60 uni-ply ballistic sheets containing a polypropylene resin.

Examples of suitable stacks of uni-ply ballistic sheets 1005 for a flexible ballistic resistant panel 100 can include a first plurality of THERMOBALLISTIC ballistic sheets 1025 arranged in a stack having a top surface and a bottom surface and bounded on the top surface by a first plurality of K-FLEX ballistic sheets 1020 and bounded on the bottom surface by a second plurality of K-FLEX ballistic sheets 1030, as shown in FIG. 11. Examples include: 2-20 K-FLEX uni-ply ballistic sheets, 2-20 THERMOBALLISTIC uni-ply ballistic sheets, 2-20 K-FLEX uni-ply ballistic sheets; 8-20 K-FLEX uni-ply ballistic sheets, 8-20 THERMOBALLISTIC uni-ply ballistic sheets, 8-20 K-FLEX uni-ply ballistic sheets; 12-20 K-FLEX uni-ply ballistic sheets, 12-20 THERMOBALLISTIC uni-ply ballistic sheets, 12-20 K-FLEX uni-ply ballistic sheets; 16 K-FLEX uni-ply ballistic sheets, 20 THERMOBALLISTIC uni-ply ballistic sheets, 16 K-FLEX uni-ply ballistic sheets; 12 K-FLEX uni-ply ballistic sheets, 16 THERMOBALLISTIC uni-ply ballistic sheets, 12 K-FLEX uni-ply ballistic sheets; 10 K-FLEX uni-ply ballistic sheets, 16 THERMOBALLISTIC uni-ply ballistic sheets, 10 K-FLEX uni-ply ballistic sheets; 8 K-FLEX uni-ply ballistic sheets, 16 THERMOBALLISTIC uni-ply ballistic sheets, 8 K-FLEX uni-ply ballistic sheets; 20-40 K-FLEX uni-ply ballistic sheets, 20-40 THERMOBALLISTIC uni-ply ballistic sheets, 20-40 K-FLEX uni-ply ballistic sheets; or 40-60 K-FLEX uni-ply ballistic sheets, 40-60 THERMOBALLISTIC uni-ply ballistic sheets, 40-60 K-FLEX uni-ply ballistic sheets. In the stacks listed above, adjacent unidirectional ballistic sheets can be oriented to simulate 0/90 x-ply. For instance, in a stack of four sheets of uni-ply, a first sheet can be oriented at 0 degrees, a second sheet can be oriented at 90 degrees, a third sheet can be oriented at 0 degrees, and a fourth sheet can be oriented at 90 degrees.

Examples of suitable stacks of uni-ply ballistic sheets 1005 can include a first plurality of K-FLEX ballistic sheets 1025 arranged in a stack having a top surface and a bottom surface and bounded on the top surface by a first plurality of THERMOBALLISTIC ballistic sheets 1020 and bounded on the bottom surface by a second plurality of THERMOBALLISTIC ballistic sheets 1030, as shown in FIG. 12. Suitable examples include: 2-20 THERMOBALLISTIC uni-ply ballistic sheets, 2-20 K-FLEX uni-ply ballistic sheets, 2-20 THERMOBALLISTIC uni-ply ballistic sheets; 8-20 THERMOBALLISTIC uni-ply ballistic sheets, 8-20 K-FLEX uni-ply ballistic sheets, 8-20 THERMOBALLISTIC uni-ply ballistic sheets; 12-20 THERMOBALLISTIC uni-ply ballistic sheets, 12-20 K-FLEX uni-ply ballistic sheets, 12-20 THERMOBALLISTIC uni-ply ballistic sheets; 16 THERMOBALLISTIC uni-ply ballistic sheets, 20 K-FLEX uni-ply ballistic sheets, 16 THERMOBALLISTIC uni-ply ballistic sheets; 12 THERMOBALLISTIC uni-ply ballistic sheets, 16 K-FLEX uni-ply ballistic sheets, 12 THERMOBALLISTIC uni-ply ballistic sheets; 10 THERMOBALLISTIC uni-ply ballistic sheets, 16 K-FLEX uni-ply ballistic sheets, 10 THERMOBALLISTIC uni-ply ballistic sheets; 8 THERMOBALLISTIC uni-ply ballistic sheets, 16 K-FLEX uni-ply ballistic sheets, 8 THERMOBALLISTIC uni-ply ballistic sheets; 20-40 THERMOBALLISTIC uni-ply ballistic sheets, 20-40 K-FLEX uni-ply ballistic sheets, 20-40 THERMOBALLISTIC uni-ply ballistic sheets; or 40-60 THERMOBALLISTIC uni-ply ballistic sheets, 40-60 K-FLEX uni-ply ballistic sheets, 40-60 THERMOBALLISTIC uni-ply ballistic sheets. In the stacks listed above, adjacent unidirectional ballistic sheets can be oriented to simulate 0/90 x-ply. For instance, in a stack of four sheets of uni-ply, a first sheet can be oriented at 0 degrees, a second sheet can be oriented at 90 degrees, a third sheet can be oriented at 0 degrees, and a fourth sheet can be oriented at 90 degrees.

Examples of suitable stacks of unidirectional ballistic sheets 1005 for a flexible ballistic resistant panel 100 can include a grouping of 2-20, 8-20, 12-20, 20-40, or 40-60 unidirectional ballistic sheets made of fibers such as, for example, aramid or UHMWPE fibers. Examples of suitable stacks of unidirectional ballistic sheets 1005 for a ballistic panel 100 can include a grouping of 2-20, 8-20, 12-20, 20-40, or 40-60 unidirectional THERMOBALLISTIC ballistic sheets. Other examples of suitable stacks of unidirectional ballistic sheets 1005 for a ballistic panel 100 can include a grouping of 2-20, 8-20, 12-20, 20-40, or 40-60 unidirectional K-FLEX ballistic sheets. Still other examples of suitable stacks of unidirectional ballistic sheets 1005 for a ballistic panel 100 can include a grouping of 2-20, 8-20, 12-20, 20-40, or 40-60 TENSYLON ballistic sheets.

Panels Constructed from Double X-Ply Ballistic Sheets

Two x-ply ballistic sheets can be bonded together to produce a configuration known as double x-ply. Examples of suitable stacks of double x-ply ballistic sheets 1005 for a flexible ballistic resistant panel 100 can include a first plurality of double x-ply ballistic sheets 1020 containing a first resin with a first melting temperature and a second plurality of double x-ply ballistic sheets 1025 containing a second resin with a second melting temperature (see, e.g., FIGS. 11 and 12). The second melting temperature can be higher than the first melting temperature. Examples include: 1-10 0/90/0/90 double x-ply ballistic sheets containing a first resin and 1-10 0/90/0/90 double x-ply ballistic sheets containing a second resin; 4-10 0/90/0/90 double x-ply ballistic sheets containing a first resin and 4-10 0/90/0/90 double x-ply ballistic sheets containing a second resin; 6-10 0/90 x-ply ballistic sheets containing a first resin and 6-10 0/90/0/90 double x-ply ballistic sheets containing a second resin; 10-15 0/90/0/90 double x-ply ballistic sheets containing a first resin and 10-15 0/90/0/90 double x-ply ballistic sheets containing a second resin; 15-20 0/90/0/90 double x-ply ballistic sheets containing a first resin and 15-20 0/90/0/90 double x-ply ballistic sheets containing a second resin.

Examples of suitable stacks of double x-ply ballistic sheets 1005 containing aramid fibers can include a first plurality of double x-ply ballistic sheets containing aramid fibers and a first resin with a first melting temperature and a second plurality of double x-ply ballistic sheets containing aramid fibers and a second resin with a second melting temperature (see, e.g., FIGS. 11 and 12). The second melting temperature can be higher than the first melting temperature. Examples include: 1-10 0/90/0/90 double x-ply ballistic sheets containing a first resin and 1-10 0/90/0/90 double x-ply ballistic sheets containing a second resin; 4-10 0/90/0/90 double x-ply ballistic sheets containing a first resin and 4-10 0/90/0/90 double x-ply ballistic sheets containing a second resin; 6-10 0/90/0/90 double x-ply ballistic sheets containing a first resin and 6-10 0/90/0/90 double x-ply ballistic sheets containing a second resin; 10-15 0/90/0/90 double x-ply ballistic sheets containing a first resin and 10-15 0/90 x-ply ballistic sheets containing a second resin; 15-20 0/90/0/90 double x-ply ballistic sheets containing a first resin and 15-20 0/90/0/90 double x-ply ballistic sheets containing a second resin.

Examples of suitable stacks of double x-ply ballistic sheets 1005 for a flexible ballistic resistant panel 100 can include a first plurality of double x-ply ballistic sheets 1020 containing a polyethylene resin with a melting temperature of about 215-240 degrees F. and a second plurality of double x-ply ballistic sheets 1025 containing a polypropylene resin with a melting temperature of about 255-295 or 295-330 F (see, e.g., FIGS. 11 and 12). Examples include: 1-10 0/90/0/90 double x-ply ballistic sheets containing a polyethylene resin and 1-10 0/90/0/90 double x-ply ballistic sheets containing a polypropylene resin; 4-10 0/90/0/90 double x-ply ballistic sheets containing a first resin and 4-10 0/90/0/90 double x-ply ballistic sheets containing a polypropylene resin; 6-10 0/90/0/90 double x-ply ballistic sheets containing a polyethylene resin and 6-10 0/90/0/90 double x-ply ballistic sheets containing a polypropylene resin; 10-15 0/90/0/90 double x-ply ballistic sheets containing a polyethylene resin and 10-15 0/90/0/90 double x-ply ballistic sheets containing a polypropylene resin; 15-20 0/90/0/90 double x-ply ballistic sheets containing a polyethylene resin and 15-20 0/90/0/90 double x-ply ballistic sheets containing a polypropylene resin.

Examples of suitable stacks of double x-ply ballistic sheets 1005 for a ballistic resistant panel 100 can include a first plurality of THERMOBALLISTIC ballistic sheets 1025 arranged in a stack having a top surface and a bottom surface and bounded on the top surface by a first plurality of K-FLEX ballistic sheets 1020 and bounded on the bottom surface by a second plurality of K-FLEX ballistic sheets 1030, as shown in FIG. 11. Examples include: 1-5 K-FLEX 0/90/0/90 double x-ply ballistic sheets, 1-5 THERMOBALLISTIC 0/90/0/90 double x-ply ballistic sheets, 1-5 K-FLEX 0/90/0/90 double x-ply ballistic sheets; 2-5 K-FLEX 0/90/0/90 double x-ply ballistic sheets, 2-5 THERMOBALLISTIC 0/90/0/90 double x-ply ballistic sheets, 2-5 K-FLEX 0/90/0/90 double x-ply ballistic sheets; 3-5 K-FLEX 0/90/0/90 double x-ply ballistic sheets, 3-5 THERMOBALLISTIC 0/90/0/90 double x-ply ballistic sheets, 3-5 K-FLEX 0/90/0/90 double x-ply ballistic sheets; 4 K-FLEX 0/90/0/90 double x-ply ballistic sheets, 5 THERMOBALLISTIC 0/900/90 double x-ply ballistic sheets, 4 K-FLEX 0/900/90 double x-ply ballistic sheets; 3 K-FLEX 0/90/0/90 double x-ply ballistic sheets, 4 THERMOBALLISTIC 0/90/0/90 double x-ply ballistic sheets, 3 K-FLEX 0/90/0/90 double x-ply ballistic sheets; 3 K-FLEX 0/90/0/90 double x-ply ballistic sheets, 4 THERMOBALLISTIC 0/90/0/90 double x-ply ballistic sheets, 3 K-FLEX 0/90/0/90 double x-ply ballistic sheets; 2 K-FLEX 0/90/0/90 double x-ply ballistic sheets, 4 THERMOBALLISTIC 0/90/0/90 double x-ply ballistic sheets, 2 K-FLEX 0/90/0/90 double x-ply ballistic sheets; 5-15 K-FLEX 0/90/0/90 double x-ply ballistic sheets, 5-15 THERMOBALLISTIC 0/90/0/90 double x-ply ballistic sheets, 5-15 K-FLEX 0/90/0/90 double x-ply ballistic sheets; or 15-20 K-FLEX 0/90/0/90 double x-ply ballistic sheets, 15-20 THERMOBALLISTIC 0/90/0/90 double x-ply ballistic sheets, 15-20 K-FLEX 0/90/0/90 double x-ply ballistic sheets.

Examples of suitable stacks of double x-ply ballistic sheets 1005 for a flexible ballistic resistant panel 100 can include a first plurality of K-FLEX ballistic sheets 1025 arranged in a stack having a top surface and a bottom surface and bounded on the top surface by a first plurality of THERMOBALLISTIC ballistic sheets 1020 and bounded on the bottom surface by a second plurality of THERMOBALLISTIC ballistic sheets 1030, as shown in FIG. 12. Examples include: 1-5 THERMOBALLISTIC 0/90/0/90 double x-ply ballistic sheets, 1-5 K-FLEX 0/90/0/90 double x-ply ballistic sheets, 1-5 THERMOBALLISTIC 0/90/0/90 double x-ply ballistic sheets; 2-5 THERMOBALLISTIC 0/90/0/90 double x-ply ballistic sheets, 2-5 K-FLEX 0/90/0/90 double x-ply ballistic sheets, 2-5 THERMOBALLISTIC 0/90/0/90 double x-ply ballistic sheets; 3-5 THERMOBALLISTIC 0/90/0/90 double x-ply ballistic sheets, 3-5 K-FLEX 0/90/0/90 double x-ply ballistic sheets, 3-5 THERMOBALLISTIC 0/90/0/90 double x-ply ballistic sheets; 4 THERMOBALLISTIC 0/90/0/90 double x-ply ballistic sheets, 5 K-FLEX 0/900/90 double x-ply ballistic sheets, 4 THERMOBALLISTIC 0/900/90 double x-ply ballistic sheets; 3 THERMOBALLISTIC 0/90/0/90 double x-ply ballistic sheets, 4 K-FLEX 0/90/0/90 double x-ply ballistic sheets, 3 THERMOBALLISTIC 0/90/0/90 double x-ply ballistic sheets; 3 THERMOBALLISTIC 0/90/0/90 double x-ply ballistic sheets, 4 K-FLEX 0/90/0/90 double x-ply ballistic sheets, 3 THERMOBALLISTIC 0/90/0/90 double x-ply ballistic sheets; 2 THERMOBALLISTIC 0/90/0/90 double x-ply ballistic sheets, 4 K-FLEX 0/90/0/90 double x-ply ballistic sheets, 2 THERMOBALLISTIC 0/90/0/90 double x-ply ballistic sheets; 5-15 THERMOBALLISTIC 0/90/0/90 double x-ply ballistic sheets, 5-15 K-FLEX 0/90/0/90 double x-ply ballistic sheets, 5-15 THERMOBALLISTIC 0/90/0/90 double x-ply ballistic sheets; or 15-20 THERMOBALLISTIC 0/90/0/90 double x-ply ballistic sheets, 15-20 K-FLEX 0/90/0/90 double x-ply ballistic sheets, 15-20 THERMOBALLISTIC 0/90/0/90 double x-ply ballistic sheets.

Examples of suitable stacks of double x-ply ballistic sheets 1005 for a flexible ballistic resistant panel 100 can include a grouping of 1-10, 4-10, 6-10, 10-15, or 15-20 double x-ply ballistic sheets made of fibers such as, for example, aramid or UHMWPE fibers. Examples of suitable stacks of double x-ply ballistic sheets 1005 for a ballistic panel 100 can include a grouping of 1-10, 4-10, 6-10, 10-15, or 15-20 THERMOBALLISTIC 0/90/0/90 double x-ply ballistic sheets. Other examples of suitable stacks of double x-ply ballistic sheets 1005 for a ballistic panel 100 can include a grouping of 1-10, 4-10, 6-10, 10-15, or 15-20 K-FLEX 0/90/0/90 double x-ply ballistic sheets.

Panels Constructed from Uni-Ply, X-Ply, or Double X-Ply Ballistic Sheets

Although specific examples of stacks made exclusively of uni-ply, x-ply, or double x-ply ballistic sheets are provided herein, these examples are not limiting. Suitable stacks can include any combination of uni-ply, x-ply, double-x ply, triple x-ply, or other more elaborate multilayered ballistic sheets. In any of the examples provided herein, two uni-ply ballistic sheets can be substituted for an x-ply ballistic sheet, an x-ply ballistic sheet can be substituted for two uni-ply ballistic sheets, four uni-ply ballistic sheets can be substituted for a double x-ply ballistic sheet, a double x-ply ballistic sheet can be substituted for four uni-ply ballistic sheets, two x-ply ballistic sheets can be substituted for a double x-ply ballistic sheets, and a double x-ply ballistic sheet can be substituted for two x-ply ballistic sheets.

Panels Constructed from Ballistic Sheets and Fiberglass Sheets

One or more fiberglass sheets (e.g. sheets made of woven glass fibers or sheets made of glass fibers arranged unidirectionally into uni-ply or x-ply), can be incorporated into any of the various stacks of ballistic sheets described herein to form a ballistic resistant panel (see, e.g. FIG. 13). Fiberglass sheets have several attributes that make them desirable for inclusion in a ballistic resistant panel. Specifically, fiberglass sheets are less expensive than sheets made of aramid fibers, which translates to lower cost panels. Also, fiberglass sheets can enhance stab resistance of the panel 100. The fiberglass sheets can have any suitable thickness depending on the application of the panel. For example, for applications that require flexible panels, the thickness of each fiberglass sheet can be about 0.006, 0.009, 0.010, 0.005-0.020, 0.010-0.020, or 0.020-0.030 inches.

Examples of suitable stacks of ballistic sheets for a ballistic resistant panel can include a plurality of x-ply ballistic sheets containing aramid fibers and a first resin with a first melting temperature and a plurality of fiberglass sheets containing glass fibers (see, e.g. FIG. 13). Examples include: 1-10 x-ply ballistic sheets containing aramid fibers and resin and 1-10 fiberglass sheets; 4-10 x-ply ballistic sheets containing aramid fibers and resin and 4-10 fiberglass sheets; 6-10 x-ply ballistic sheets containing aramid fibers and resin and 6-10 fiberglass sheets; 10-15 x-ply ballistic sheets containing aramid fibers and resin and 10-15 fiberglass sheets; 15-20 x-ply ballistic sheets containing aramid fibers and resin and 15-20 fiberglass sheets.

Examples of suitable stacks of ballistic sheets for a ballistic resistant panel 100 can include a first plurality of x-ply ballistic sheets containing a polyethylene resin with a melting temperature of about 215-240 degrees F. and a plurality of s-glass sheets (see, e.g. FIG. 13). Suitable examples include: 1-10 0/90 x-ply ballistic sheets containing a polyethylene resin and 1-10 s-glass fiberglass sheets; 4-10 0/90 x-ply ballistic sheets containing a polyethylene resin and 4-10 s-glass fiberglass sheets; 6-10 0/90 x-ply ballistic sheets containing a polyethylene resin and 6-10 s-glass fiberglass sheets; 10-20 0/90 x-ply ballistic sheets containing a polyethylene resin and 10-20 s-glass fiberglass sheets; 20-30 0/90 x-ply ballistic sheets containing a polyethylene resin and 20-30 s-glass fiberglass sheets.

Examples of suitable stacks of ballistic sheets 1005 for a ballistic resistant panel 100 can include a first plurality of s-glass fiberglass sheets 1025 arranged in a stack having a top surface and a bottom surface and bounded on the top surface by a first plurality of K-FLEX ballistic sheets 1020 and bounded on the bottom surface by a second plurality of K-FLEX ballistic sheets 1030, as shown in FIG. 13. Examples include: 1-10 K-FLEX 0/90 x-ply ballistic sheets, 1-10 s-glass fiberglass sheets, 1-10 K-FLEX 0/90 x-ply ballistic sheets; 4-10 K-FLEX 0/90 x-ply ballistic sheets, 4-10 s-glass fiberglass sheets, 4-10 K-FLEX 0/90 x-ply ballistic sheets; 6-10 K-FLEX 0/90 x-ply ballistic sheets, 6-10 s-glass fiberglass sheets, 6-10 K-FLEX 0/90 x-ply ballistic sheets; 8 K-FLEX 0/90 x-ply ballistic sheets, 10 s-glass fiberglass sheets, 8 K-FLEX 0/90 x-ply ballistic sheets; 8 K-FLEX 0/90 x-ply ballistic sheets, 5-7 s-glass fiberglass sheets, 8 K-FLEX 0/90 x-ply ballistic sheets; 6 K-FLEX 0/90 x-ply ballistic sheets, 8 s-glass fiberglass sheets, 6 K-FLEX 0/90 x-ply ballistic sheets; 5 K-FLEX 0/90 x-ply ballistic sheets, 8 s-glass fiberglass sheets, 5 K-FLEX 0/90 x-ply ballistic sheets; 4 K-FLEX 0/90 x-ply ballistic sheets, 8 s-glass fiberglass sheets, 4 K-FLEX 0/90 x-ply ballistic sheets; 6 K-FLEX 0/90 x-ply ballistic sheets, 6 s-glass fiberglass sheets, 6 K-FLEX 0/90 x-ply ballistic sheets; 5 K-FLEX 0/90 x-ply ballistic sheets, 5 s-glass fiberglass sheets, 5 K-FLEX 0/90 x-ply ballistic sheets; or 2 or more K-FLEX 0/90 x-ply ballistic sheets, 1 or more s-glass fiberglass sheets, 2 or more K-FLEX 0/90 x-ply ballistic sheets.

Suitable stacks can include one or more uni-ply ballistic sheets and one or more fiberglass sheets. Examples include: 1-20 K-FLEX uni-ply ballistic sheets, 1-10 s-glass fiberglass sheets, 1-20 K-FLEX uni-ply ballistic sheets; 8-20 K-FLEX uni-ply ballistic sheets, 4-10 s-glass fiberglass sheets, 8-20 K-FLEX uni-ply ballistic sheets; 12-20 K-FLEX uni-ply ballistic sheets, 6-10 s-glass fiberglass sheets, 12-20 K-FLEX uni-ply ballistic sheets; 16 K-FLEX uni-ply ballistic sheets, 10 s-glass fiberglass sheets, 16 K-FLEX uni-ply ballistic sheets; 16 K-FLEX uni-ply ballistic sheets, 5-7 s-glass fiberglass sheets, 16 K-FLEX uni-ply ballistic sheets; 12 K-FLEX uni-ply ballistic sheets, 8 s-glass fiberglass sheets, 12 K-FLEX uni-ply ballistic sheets; 10 K-FLEX uni-ply ballistic sheets, 8 s-glass fiberglass sheets, 10 K-FLEX uni-ply ballistic sheets; 8 K-FLEX uni-ply ballistic sheets, 8 s-glass fiberglass sheets, 8 K-FLEX uni-ply ballistic sheets; 12 K-FLEX uni-ply ballistic sheets, 6 s-glass fiberglass sheets, 12 K-FLEX 0/90 x-ply ballistic sheets; or 10 K-FLEX uni-ply ballistic sheets, 5 s-glass fiberglass sheets, 10 K-FLEX uni-ply ballistic sheets; or 2 or more K-FLEX uni-ply ballistic sheets, 1 or more s-glass fiberglass sheets, 2 or more K-FLEX uni-ply ballistic sheets.

Suitable stacks can include one or more double x-ply ballistic sheets and one or more fiberglass sheets. Examples include: 1-10 K-FLEX 0/90/0/90 double x-ply ballistic sheets, 1-10 s-glass fiberglass sheets, 1-10 K-FLEX 0/90/0/90 double x-ply ballistic sheets; 2-5 K-FLEX 0/90/0/90 double x-ply ballistic sheets, 4-10 s-glass fiberglass sheets, 2-5 K-FLEX 0/90/0/90 double x-ply ballistic sheets; 6-10 K-FLEX 0/90/0/90 double x-ply ballistic sheets, 6-10 s-glass fiberglass sheets, 3-5 K-FLEX 0/90/0/90 double x-ply ballistic sheets; 4 K-FLEX 0/90/0/90 double x-ply ballistic sheets, 10 s-glass fiberglass sheets, 4 K-FLEX 0/90/0/90 double x-ply ballistic sheets; 4 K-FLEX 0/90/0/90 double x-ply ballistic sheets, 5-7 s-glass fiberglass sheets, 4 K-FLEX 0/90/0/90 double x-ply ballistic sheets; 3 K-FLEX 0/90/0/90 double x-ply ballistic sheets, 4-8 s-glass fiberglass sheets, 3 K-FLEX 0/90/0/90 double x-ply ballistic sheets; 2 K-FLEX 0/90/0/90 double x-ply ballistic sheets, 4-8 s-glass fiberglass sheets, 2 K-FLEX 0/90/0/90 double x-ply ballistic sheets; 4 K-FLEX 0/90/0/90 double x-ply ballistic sheets, 8 s-glass fiberglass sheets, 4 K-FLEX 0/90/0/90 double x-ply ballistic sheets; 3 K-FLEX 0/90/0/90 double x-ply ballistic sheets, 6 s-glass fiberglass sheets, 3 K-FLEX 0/90/0/90 double x-ply ballistic sheets; 3 K-FLEX 0/90/0/90 double x-ply ballistic sheets, 5 s-glass fiberglass sheets, 3 K-FLEX 0/90/0/90 double x-ply ballistic sheets; or 2 or more K-FLEX 0/90/0/90 double x-ply ballistic sheets, 1 or more s-glass fiberglass sheets, 2 or more K-FLEX 0/90/0/90 double x-ply ballistic sheets.

Methods or Manufacturing Flexible Ballistic Resistant Panels

A method of manufacturing a ballistic resistant panel 100 can include providing a stack of ballistic sheets 1005, inserting the stack of ballistic sheets into a vacuum bag 1310, evacuating air from the vacuum bag, and heating the stack of ballistic sheets in the vacuum bag to a predetermined temperature for a predetermined duration. In some examples, the predetermined temperature can be about 250-550, 225-550, 225-350, 250-300, 250-275, 265-275, 225-250, or 200-240 degrees F., and the predetermined duration can be about 1, 5, 15-30, 30-60, 45-60, 60-120, 120-240, or 240-480 minutes. The method can include applying a predetermined pressure to the stack of ballistic sheets in the vacuum bag for a second predetermined duration. The predetermined pressure can be about 10-100, 50-75, 75-100, 100-500, 500-1,000, 1,000-2,500, 2,500-15,000, or 15,000-30,000 psi, and the second predetermined duration can be about 1, 5, 15-30, 30-60, 45-60, 60-120, 120-240, or 240-480 minutes. The step of heating the stack of ballistic sheets in the vacuum bag to the predetermined temperature for the predetermined duration can occur concurrently with applying the predetermined pressure to the stack of ballistic sheets in the vacuum bag 1310 for the second predetermined duration. The method can include encasing the stack of ballistic sheets 1005 in a waterproof cover 1105 prior to inserting the stack of ballistic sheets into the vacuum bag 1310. The waterproof cover 1105 can be made of nylon coated with polyurethane, polypropylene, polyethylene, or polyvinylchloride.

With respect to the method described above, the stack of ballistic sheets 1005 can include a first plurality of ballistic sheets 1020 having a first resin with a melting temperature of about 215-240, 240-265, 265-295, or 295-340 degrees F. The stack 1005 can also include a second plurality of ballistic sheets 1025 adjacent to the first plurality of ballistic sheets, where the second plurality of ballistic sheets have a second resin with a melting temperature of about 255-295, 295-330, 330-355, or 355-375 degrees F. The stack 1005 can also include a third plurality of ballistic sheets 1030 adjacent to the second plurality of ballistic sheets, where the third plurality of ballistic sheets have a third resin with a melting temperature of about 215-240, 240-265, 265-295, or 295-340 degrees F. The first plurality of ballistic sheets 1020 can include 1-10, 10-20, or 20-30 x-ply ballistic sheets, where the ballistic sheets are made of aramid fibers and the first resin is made of polyethylene. The second plurality of ballistic sheets 1025 can include 1-10, 10-20, or 20-30 x-ply ballistic sheets, where the ballistic sheets are made of aramid fibers and the second resin is made of polypropylene. Similar to the first plurality of ballistic sheets 1020, the third plurality of ballistic sheets 1030 can include 1-10, 10-20, or 20-30 x-ply ballistic sheets, where the ballistic sheets are made of aramid fibers and the third resin is made of polyethylene.

Following the heating and pressure steps described above, the method can also include a step of cooling the stack of ballistic sheets 1005 in the vacuum bag 1310 from the predetermined temperature to room temperature. Cooling can occur using any suitable heat transfer method, such as natural convection, forced convection, or conduction (e.g. by submerging the waterproof panels 100 in a cooling bath).

In some methods of manufacturing flexible ballistic resistant panels 100, a stack of ballistic sheets 1005 can be provided where the stack has a first plurality of ballistic sheets 1020, a second plurality of ballistic sheets 1025 adjacent to the first plurality of ballistic sheets, and a third plurality of ballistic sheets 1030 adjacent to the second plurality of ballistic sheets. Each of the first plurality of ballistic sheets 1020 can be formed of a first arrangement of aramid fibers, where the first arrangement of aramid fibers defines a two-dimensional pattern. The first plurality of ballistic sheets 1020 can be stacked according to the two-dimensional pattern. Each of the second plurality of ballistic sheets 1025 can be formed of a second arrangement of aramid fibers, where the second arrangement of aramid fibers substantially conforms to the two-dimensional pattern. The second plurality of ballistic sheets 1025 can be stacked according to the two-dimensional pattern. Each of the third plurality of ballistic sheets 1030 can be formed of a third arrangement of aramid fibers, where the third arrangement of aramid fibers substantially conforms to the two-dimensional pattern. The third plurality of ballistic sheets 1030 can be stacked according to the two-dimensional pattern. The first plurality of ballistic sheets 1020, the second plurality of ballistic sheets 1025, and the third plurality of ballistic sheets 1030 can be formed in a stack 1005 according to the two-dimensional pattern. The method can include inserting the stack of ballistic sheets 1005 into a vacuum bag 1310 and evacuating air from the vacuum bag. The method can include heating the stack of ballistic sheets 1005 to a predetermined temperature for a predetermined duration. The predetermined temperature can be between about 200 and 500 degrees F. and, more specifically, about 250-300, 265-275, 225-250, or 200-240 degrees F. The predetermined duration can be at least 5 minutes and, more specifically, about 30-45, 45-60, or 60-120 minutes. The method can include applying a predetermined pressure to the stack of ballistic sheets 1005 in the vacuum bag 1310 for a second predetermined duration. The predetermined pressure can be at least 10 psi, and the second predetermined duration is at least 5 minutes. More specifically, the predetermined pressure can be about 10-100, 50-75, or 75-100 psi, and the second predetermined duration can be about 30-45, 45-60, 60-120, 120-240, 240-480 minutes.

In the method described above, applying the predetermined pressure to the stack of ballistic sheets 1005 in the vacuum bag 1310 for the second predetermined duration can occur concurrently with heating the stack of ballistic sheets in the vacuum bag to the predetermined temperature for the predetermined duration. The method can include encasing the stack of ballistic sheets 1005 in a waterproof cover 1105, as shown in FIG. 7, prior to inserting the stack of ballistic sheets into the vacuum bag 1310. The waterproof cover can be made of nylon coated with polyurethane, polyvinylchloride, polypropylene, or polyethylene.

In the method described above, the first plurality of ballistic sheets 1020 can include a first resin with a melting temperature of about 215-240 degrees F., the second plurality of ballistic sheets 1025 can include a second resin with a melting temperature of about 255-295 degrees F., and the third plurality of ballistic sheets 1030 can include a third resin with a melting temperature of about 215-240 degrees F. To promote partial or full bonding of the ballistic sheets within the first and third pluralities of ballistic sheets (and to avoid bonding of the ballistic sheets within second plurality of ballistic sheets 1025), the predetermined temperature can be about 200-240 or 225-250 degrees F., which is below the melting temperature of the second resin.

In another example, the first plurality of ballistic sheets 1020 can include a first resin with a melting temperature of about 215-240 degrees F., the second plurality of ballistic sheets 1025 can include a second resin with a melting temperature of about 295-330 degrees F., and the third plurality of ballistic sheets 1030 can include a third resin with a melting temperature of about 215-240 degrees F. To promote partial or full bonding of the ballistic sheets within the first and third pluralities of ballistic sheets (and to avoid bonding of the ballistic sheets within second plurality of ballistic sheets 1025), the predetermined temperature can be about 200-240, 225-250, or 265-275 degrees F., which is below the melting temperature of the second resin. In this example, the first plurality of ballistic sheets 1020 can include 1-10 K-FLEX 0/90 x-ply ballistic sheets, the second plurality of ballistic sheets 1025 can include 1-10 THERMOBALLISTIC 0/90 x-ply ballistic sheets, and the third plurality of ballistic sheets 1030 can include 1-10 K-FLEX 0/90 x-ply ballistic sheets.

The method described above can further include cooling the stack of ballistic sheets 1005 in the vacuum bag from the predetermined temperature to room temperature. The method can also include subjecting the panel 100 to a break-in process to enhance its flexibility.

Flexible Ballistic Panel Having a Plurality of Ballistic Sheets

In one example, as shown in FIG. 10, a flexible ballistic resistant panel can include a plurality of ballistic sheets (i.e. a stack of ballistic sheets 1005). Each of the plurality of ballistic sheets 1005 can be formed of an arrangement of higher performance fibers (e.g. aramid fibers), and the arrangement of high performance fibers can define a two-dimensional pattern. The plurality of ballistic sheets can be stacked according to the two-dimensional pattern, where each of the plurality of ballistic sheets is at least partially bonded to at least one adjacent ballistic sheet in the plurality of ballistic sheets. In some examples, the plurality of ballistic sheets 1005 can include 1-10, 10-20, or 20-30 ballistic sheets. The plurality of ballistic sheets 1005 can be made of a plurality of high performance fibers coated with a thermoplastic polymer resin. The thermoplastic polymer resin can have a melting temperature of about 215-240, 240-265, 265-295, 295-340, 340-355, or 355-375 degrees F.

In another example, as shown in FIG. 10, a flexible ballistic resistant panel 100 can include a plurality of ballistic sheets 1005. Each of the plurality of ballistic sheets can be formed of an arrangement of high performance fibers, such as thermoplastic polyethylene fibers (e.g. UHMWPE fibers), and the arrangement of thermoplastic polyethylene fibers can define a two-dimensional pattern. The plurality of ballistic sheets 1005 can be stacked according to the two-dimensional pattern, where each of the plurality of ballistic sheets is at least partially bonded to at least one adjacent ballistic sheet in the plurality of ballistic sheets. In some examples, the plurality of ballistic sheets can include 1-10, 10-20, or 20-30 ballistic sheets made of thermoplastic polyethylene fabric, such as TENSYLON.

The plurality of ballistic sheets 1005, whether containing aramid fibers, thermoplastic polyethylene fibers, or both, can be encased by a waterproof cover 1105, as shown in FIG. 10. The waterproof cover 1105 can be made of any suitable material, such as rubber, NYLON, RAYON, ripstop NYLON, CORDURA, polyvinyl chloride, polyurethane, silicone elastomer, or fluoropolymer. The waterproof cover 1105 can be adhered to an outer surface of the plurality of ballistic sheets 1005 to prevent movement of the plurality of ballistic sheets relative to the waterproof cover. The flexible ballistic resistant panel 100 can include a coating on the inner surface of the waterproof cover. The coating can improve water resistance and can serve as an adhesive layer. The coating can be made of polyurethane, polyvinylchloride, polyethylene, or polypropylene.

Flexible Ballistic Panel Having First and Second Pluralities of Ballistic Sheets A flexible ballistic resistant panel 100 can include a first plurality of ballistic sheets 1020 made of aramid fibers and coated with a first resin having a first melting temperature. The flexible ballistic resistant panel can also include a second plurality of ballistic sheets 1025 adjacent to the first plurality of ballistic sheets, where the second plurality of ballistic sheets are made of aramid fibers coated with a second resin having a second melting temperature. The second melting temperature can be greater than the first melting temperature. The first resin can be a thermoplastic polymer with a melting temperature of about 215-240 degrees F. The second resin can be a thermoplastic polymer with a melting temperature of about 255-295 or 295-330 degrees F. In some examples, the first resin can be polyethylene, and the second resin can be polypropylene. The first plurality of ballistic sheets 1020 can include about 1-10, 10-20, or 20-30 ballistic sheets. Similarly, the second plurality of ballistic sheets 1025 can include about 1-10, 10-20, or 20-30 ballistic sheets. In certain examples, the first plurality of ballistic sheets 1020 can include 1-10, 10-20, or 20-30 K-FLEX 0/90 x-ply ballistic sheets, and the second plurality of ballistic sheets 1025 can include 1-10, 10-20, or 20-30 THERMOBALLISTIC 0/90 x-ply ballistic sheets. In some examples, the first plurality of ballistic sheets 1020 can include 5-10 K-FLEX 0/90 x-ply ballistic sheets, and the second plurality of ballistic sheets 1025 can include 5-10 THERMOBALLISTIC 0/90 x-ply ballistic sheets. The flexible ballistic resistant panel 100 can include a waterproof cover 1105 encasing the first and second pluralities of ballistic sheets (1020, 1025). The waterproof cover 1105 can be made of any suitable material, such as nylon coated with polyurethane, polypropylene, polyvinylchloride, or polyethylene.

Flexible Ballistic Panel Having First, Second, and Third Pluralities of Ballistic Sheets A flexible ballistic resistant panel 100 can include a first plurality of ballistic sheets 1020, each of the first plurality of ballistic sheets 1020 being formed of a first arrangement of aramid fibers. The first arrangement of aramid fibers can define a two-dimensional pattern, and the first plurality of ballistic sheets 1020 can be stacked according to the two-dimensional pattern. The flexible ballistic resistant panel 100 can include a second plurality of ballistic sheets 1025 adjacent to the first plurality of ballistic sheets. Each of the second plurality of ballistic sheets 1025 can be formed of a second arrangement of aramid fibers. The second arrangement of aramid fibers can substantially conform to the two-dimensional pattern, and the second plurality of ballistic sheets can be stacked according to the two-dimensional pattern. The flexible ballistic resistant panel 100 can include a third plurality of ballistic sheets 1030 adjacent to the second plurality of ballistic sheets. Each of the third plurality of ballistic sheets 1030 can be formed of a third arrangement of aramid fibers. The third arrangement of aramid fibers can substantially conform to the two-dimensional pattern, and the third plurality of ballistic sheets 1030 can be stacked according to the two-dimensional pattern. The first plurality of ballistic sheets 1020, the second plurality of ballistic sheets 1025, and the third plurality of ballistic sheets 1030 can be formed in a stack 1005 according to the two-dimensional pattern. The flexible ballistic resistant panel 100 can include a waterproof cover 1105 encasing the first plurality of ballistic sheets 1020, the second plurality of ballistic sheets 1025, and the third plurality of ballistic sheets 1030. Within the panel 100, each of the first plurality of ballistic sheets 1020 can be at least partially bonded to at least one adjacent ballistic sheet in the first plurality of ballistic sheets. Likewise, each of the third plurality of ballistic sheets 1030 can be at least partially bonded to at least one adjacent ballistic sheet in the third plurality of ballistic sheets.

The first plurality of ballistic sheets 1020 can include 1-10, 10-20, or 20-30 ballistic sheets, the second plurality of ballistic sheets 1025 can include 1-10, 10-20, or 20-30 ballistic sheets, and the third plurality of ballistic sheets 1030 can include 1-10, 10-20, or 20-30 ballistic sheets. In some examples, where the flexible ballistic resistant panel 100 is configured to be certified as Type IIIA flexible armor under NIJ Standard-0101.06, the first plurality of ballistic sheets 1020 can include 5-10 or 6-8 ballistic sheets, the second plurality of ballistic sheets 1025 can include 5-10 or 6-8 ballistic sheets, and the third plurality of ballistic sheets 1030 can include 5-10 or 6-8 ballistic sheets. In some examples, the first plurality of ballistic sheets 1020 can be K-FLEX 0/90 x-ply ballistic sheets, the second plurality of ballistic sheets 1025 can be THERMOBALLISTIC 0/90 x-ply ballistic sheets, and the third plurality of ballistic sheets 1030 can be K-FLEX 0/90 x-ply ballistic sheets. The panel 100 can have a thickness of less than 0.5, 0.375, or 0.25 inches, and where the panel is configured to be certified as Type IIIA flexible armor under NIJ Standard-0101.06, can have a thickness of 0.15-0.22 or about 0.215 inches.

The first plurality of ballistic sheets 1020 can include a first resin made of polyethylene and having a melting temperature of about 215-240, 240-265, 265-295, or 295-340 degrees F. The second plurality of ballistic sheets 1025 can include a second resin made of polypropylene and having a melting temperature of about 255-295, 295-330, 330-355, or 355-375 degrees F. The third plurality of ballistic sheets 1030 can include a third resin made of polyethylene and having a melting temperature of about 215-240, 240-265, 265-295, or 295-340 degrees F.

In some examples, the flexible ballistic resistant panel 100 can include a first plurality of ballistic sheets 1020 made of high performance fibers, such as aramid fibers. Each ballistic sheet within the first plurality of ballistic sheets 1020 can be at least partially bonded to at least one adjacent ballistic sheet in the first plurality of ballistic sheets. The panel 100 can include a second plurality of ballistic sheets 1025 made of high performance fibers, such as aramid fibers. The second plurality of ballistic sheets 1025 can be positioned adjacent to the first plurality of ballistic sheets 1020. The panel 100 can include a third plurality of ballistic sheets 1030 made of high performance fibers, such as aramid fibers. The third plurality of ballistic sheets 1030 can be positioned adjacent to the second plurality of ballistic sheets 1025. Each ballistic sheet within the third plurality of ballistic sheets 1030 can be at least partially bonded to at least one adjacent ballistic sheet in the third plurality of ballistic sheets. The first plurality of ballistic sheets 1020 can include 1-10, 10-20, or 20-30 ballistic sheets, the second plurality of ballistic sheets 1025 can include 1-10, 10-20, or 20-30 ballistic sheets, and the third plurality of ballistic sheets 1030 can include 1-10, 10-20, or 20-30 ballistic sheets. In certain examples, first plurality of ballistic sheets 1020 can include 1-10 K-FLEX 0/90 x-ply ballistic sheets, the second plurality of ballistic sheets 1025 can include 1-10 THERMOBALLISTIC 0/90 x-ply ballistic sheets or s-glass fiberglass sheets, and the third plurality of ballistic sheets 1030 can include 1-10 K-FLEX 0/90 x-ply ballistic sheets. The panel 100 can include a waterproof cover encasing a stack of ballistic sheets 1005 consisting of the first plurality of ballistic sheets 1020, the second plurality of ballistic sheets 1025, and the third plurality of ballistic sheets 1030. In some examples, the waterproof cover 1105 can be made of nylon coated with polyurethane, polypropylene, polyethylene, or polyvinylchloride. A first resin in the first plurality of ballistic sheets 1020 can have a melting temperature of about 215-240, 240-265, 265-295, or 295-340 degrees F. A second resin in the second plurality of ballistic sheets 1025 can have a melting temperature of about 255-295, 295-330, 330-355, or 355-375 degrees F. A third resin in the third plurality of ballistic sheets can have a melting temperature of about 215-240, 240-265, 265-295, or 295-340 degrees F.

Stitching

The flexible ballistic resistant panels 100 described herein do not require stitching to be as effective, or more effective, than existing panels with similar dimensions. However, where added labor costs are not a primary concern, the panels described herein can include stitches, such as quilt stitches, radial stitches, row stitches, box stitches, or a combination thereof. Stitches can be added to the stack of ballistic sheets at any stage in the manufacturing process, including before vacuum bagging, after vacuum bagging, before heating, after heating, before applying pressure, after applying pressure, etc. Stitches may be desirable to defend against certain types of ballistic threats.

Reversible Panel

Many ballistic resistant panels are designed to have a strike face (see, e.g. the ceramic plate 32 in FIG. 5) and a wear face. A strike face is a surface that is designed to face an incoming ballistic threat, and a wear face is a surface that is designed to face the wearer's torso. Panels with a strike face are directional and must be oriented with the strike face facing toward an incoming projectile. If the panel is improperly oriented and a projectile strikes the wear face, the panel will likely fail to perform at the panel's certification level. For example, if a soldier inserts a ballistic resistant panel into a carrier vest, but accidentally orients the panel with the wear face directed outward, the panel may fail to perform according to its certification level when struck by a projectile, and the projectile may pass through the panel.

To ensure consistent performance of the ballistic resistant panel regardless of its orientation, it can be desirable to create a panel 100 that does not have a wear face. Instead, the panel 100 can be symmetrical or nearly symmetrical from a front surface to a back surface (e.g. the panel can have a symmetrical arrangement of ballistic sheets), thereby permitting either side of the panel to serve as a strike face without altering performance. In other instances, it may be suitable to have a non-symmetrical panel. For example, a non-symmetrical panel may be suitable where the panel will be permanently or semi-permanently installed (e.g. in a vehicle door or around an oil or gas pipeline), since the panel will not be moved often and, therefore, the risk of user installation error is greatly diminished or eliminated entirely.

Multiple Stacks of Ballistic Sheets

Two or more stacks of ballistic sheets 1005 can be combined to provide additional protection against ballistic threats. For example, two or more stacks of ballistic sheets 1005 can be combined to form a stack of panels 200, as shown in FIGS. 14-16. In one example shown in FIG. 15, two stacks of ballistic sheets 1005 can be combined within a single waterproof cover 1105 to form a combined stack of ballistic sheets 4005. The combined stack 4005 can include a first plurality of ballistic sheets 1020, a second plurality of ballistic sheets 1025, a third plurality of ballistic sheets 1030, a fourth plurality of ballistic sheets 1035, and a fifth plurality of ballistic sheets 1040. This configuration can be desirable in situations where ballistic performance is more important than flexibility, since flexibility will decrease as the number of ballistic sheets in the stack increases. In this example, the third plurality 1030 may in fact be two pluralities of the same type of ballistic sheets that are shown as a single plurality of ballistic sheets after the two separate stacks are arranged into a combined stack.

In some examples, the stack of panels 200 can include two or more flexible panels 100. FIG. 14 shows a stack of panels 200 containing two flexible ballistic resistant panels 100. FIG. 16 shows a stack of panels 200 containing three flexible ballistic resistant panels 100. Each flexible panel 100 can include its own waterproof cover 1105, and the stack of panels 200 can include an additional waterproof cover 4105 to provide even greater protection against water intrusion. For example, if the additional waterproof cover 4105 is torn during use, the individual waterproof covers 1105 will protect each stack of ballistic sheets 1005 within each flexible panel 100 from water intrusion.

Modular Armor Systems

A modular armor system can include a carrier vest 30, similar to the vest shown in FIG. 5, configured to receive one or more flexible ballistic resistant panels 100 as described herein. The carrier vest may be adapted to fit a human torso and may include a pouch adapted to receive and store the one or more flexible ballistic resistant panels 100. Each flexible ballistic resistant panel 100 can include a portion of hook and loop fastener (or other suitable fastener) attached to an exterior surface of the panel. The fastener can permit a user to quickly add or remove panels 100 as needed to protect against ballistic threats. In one example, a soldier can modify the number of panels 100 in a stack of panels disposed in the pouch of the carrier vest 30 based on a threat level of a combat situation. If the threat level is higher than expected, the soldier can add one or more additional panels 100 to the stack for added protection. Alternately, if the threat level is lower than expected, the soldier can remove one or more panels from the stack of panels to reduce the weight of the stack, increase the flexibility of the stack, and thereby enhance the soldier's mobility.

In some examples, a modular armor system can include a carrier vest 30 adapted to fit a human torso, where the carrier vest includes a pouch adapted to receive and store one or more flexible ballistic resistant panels 100 as described herein. The one or more flexible ballistic resistant panels 100 can be adapted to fit inside the pouch of the carrier vest. Each of the flexible ballistic resistant panels 100 can include at least a first plurality of ballistic sheets 1020 and a second plurality of ballistic sheets 1025. The first plurality of ballistic sheets 1020 can be made of aramid fibers and a can be coated with a first resin having a first melting temperature. Similarly, the second plurality of ballistic sheets 1025, which can be adjacent to the first plurality of ballistic sheets 1020, can be made of aramid fibers and can be coated with a second resin having a second melting temperature, where the second melting temperature is greater than the first melting temperature.

Each of the one or more flexible ballistic resistant panels 100 can include a portion of hook and loop fastener attached to an exterior surface of the panel. The portion of hook and loop fastener can allow the flexible ballistic resistant panel 100 to be removably attached to a second flexible ballistic resistant panel 100 to prevent relative shifting. The first resin can be a thermoplastic polymer having a melting temperature of about 215-240 degrees F. The second resin can be a thermoplastic polymer having a melting temperature of about 255-295 or 295-330 degrees F. In some examples, the first resin can be polyethylene, and the second resin can be polypropylene. Within each flexible ballistic resistant panel 100, the first plurality of ballistic sheets 1020 can include 1-10, 10-20, or 20-30 ballistic sheets, such as K-FLEX 0/90 x-ply ballistic sheets, and the second plurality of ballistic sheets 1025 can include 1-10, 10-20, or 20-30 ballistic sheets, such as THERMOBALLISTIC 0/90 x-ply ballistic sheets.

Protective Cover for Oil or Gas Pipeline

A flexible ballistic resistant panel 100 can be adapted to serve as a ballistic resistant cover for an oil or gas pipeline. The flexible ballistic resistant panel 100 can include a plurality of ballistic sheets 1005, and each of the plurality of ballistic sheets can be formed of an arrangement of high performance fibers. The arrangement of high performance fibers can define a two-dimensional pattern. The plurality of ballistic sheets 1005 can be stacked according to the two-dimensional pattern. Within the stack 1005, each of the plurality of ballistic sheets can be at least partially bonded to at least one adjacent ballistic sheet in the plurality of ballistic sheets. The flexible ballistic resistant panel 100 can also include a waterproof cover 1105 encasing the plurality of ballistic sheets. In some examples, the waterproof cover 1105 can include an adhesive coating on an inner surface. The adhesive coating can adhere the waterproof cover 1105 to an outer surface of the plurality of ballistic sheets to prevent movement of the waterproof cover relative to the plurality of ballistic sheets. The adhesive coating can be made of polyurethane, polyvinylchloride, polyethylene, or polypropylene. The waterproof cover 1105 can be made of rubber, NYLON, RAYON, ripstop NYLON, CORDURA, polyvinyl chloride, polyurethane, silicone elastomer, or fluoropolymer. The waterproof cover 1105 can be coated with an ultraviolet (UV) protectant to limit damage from sunlight exposure.

In some examples, the flexible ballistic resistant panel 100 can include a magnetic attachment feature configured to allow quick and easy mounting of the flexible ballistic resistant panel to an outer surface of a steel pipeline. In other examples, the magnetic attachment feature can be replaced with any other suitable attachment feature such as, for example, zippers, snaps, or hook and loop fasteners.

The plurality of ballistic sheets 1005 within flexible ballistic resistant panel 100 for the oil or gas pipeline can include about 1-10, 10-20, or 20-30 ballistic sheets. The plurality of ballistic sheets 1005 can be made from a plurality of aramid fibers coated with a thermoplastic polymer resin. The thermoplastic polymer resin can have a melting temperature of about 215-240, 255-295, or 295-330 degrees F. The panel 100 can be manufactured according to any of the manufacturing methods specifically described herein.

Ballistic Performance Standards

The ballistic resistant panels 100 described herein can be configured to comply with certain performance standards, such as those set forth in NIJ Standard-0101.06, *Ballistic Resistance of Body Armor* (July 2008), which is hereby incorporated by reference in its entirety. The National Institute of Justice (NIJ), which is part of the U.S. Department of Justice (DOJ), is responsible for setting minimum performance standards for law enforcement equipment, including minimum performance standards for police body armor. Under NIJ Standard-0101.06, personal body armor is classified into five categories (IIA, II, IIIA, III, IV) based on ballistic performance of the armor. Type IIA armor that is new and unworn is tested with 9 mm Full Metal Jacketed Round Nose (FMJ RN) bullets with a specified mass of 8.0 g (124 gr) and a velocity of 373 m/s±9.1 m/s (1225 ft/s±30 ft/s) and with .40 S&W Full Metal Jacketed (FMJ) bullets with a specified mass of 11.7 g (180 gr) and a velocity of 352 m/s±9.1 m/s (1155 ft/s±30 ft/s). Type II armor that is new and unworn is tested with 9 mm FMJ RN bullets with a specified mass of 8.0 g (124 gr) and a velocity of 398 m/s±9.1 m/s (1305 ft/s±30 ft/s) and with 0.357 Magnum Jacketed Soft Point (JSP) bullets with a specified mass of 10.2 g (158 gr) and a velocity of 436 m/s±9.1 m/s (1430 ft/s±30 ft/s). Type IIIA armor that is new and unworn shall be tested with .357 SIG FMJ Flat Nose (FN) bullets with a specified mass of 8.1 g (125 gr) and a velocity of 448 m/s±9.1 m/s (1470 ft/s±30 ft/s) and with .44 Magnum Semi Jacketed Hollow Point (SJHP) bullets with a specified mass of 15.6 g (240 gr) and a velocity of 436 m/s±9.1 m/s (1430 ft/s±30 ft/s). Type III flexible armor shall be tested in both the "as new" state and the conditioned state with 7.62 mm FMJ, steel jacketed bullets (U.S. Military designation M80) with a specified mass of 9.6 g (147 gr) and a velocity of 847 m/s±9.1 m/s (2780 ft/s±30 ft/s). Type IV flexible armor shall be tested in both the "as new" state and the conditioned state with .30 caliber AP bullets (U.S. Military designation M2 AP) with a specified mass of 10.8 g (166 gr) and a velocity of 878 m/s±9.1 m/s (2880 ft/s±30 ft/s).

The term "ballistic limit" describes the impact velocity required to perforate a target with a certain type of projectile. To determine the ballistic limit of a target, a series of experimental tests must be conducted. During the tests, the velocity of the certain type of projectile is increased until the target is perforated. The term "$V_{50}$" designates the velocity at which half of the certain type of projectiles fired at the target will penetrate the target and half will not.

Panel Dimensions and Weight

The flexible ballistic resistant panels 100 described herein are lighter and thinner than existing panels with a similar threat level certification. For instance, an existing stitched panel certified as Type IIIA has a weight of about 1.25 pounds for a 1 foot by 1 foot panel and a thickness of about 0.300 inches. Conversely, the panels 100 described herein, which have achieved the same certification, have a weight of about 1.0 pound for a 1 foot by 1 foot panel and a thickness of about 0.215 inches. A panel that is thinner and lighter is more versatile and is suitable for a wider range of applications.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A ballistic resistant panel, comprising:
   a vehicle door including an outer door structure having a gap between a side window and a lip of said outer door structure;
   a ballistic resistant panel having an outer perimeter sized to fit within a cavity of said vehicle door between said side window and said outer door structure;
   a flexible excess cover portion upwardly extending from a top edge of said ballistic resistant panel, said flexible excess cover portion extending through said gap located between said side window and said lip of said outer door structure, said flexible excess cover portion folding over said lip of said outer door structure; and
   a weatherstrip installed on said lip of said outer door structure, said weatherstrip securing said flexible excess cover portion against said lip of said outer door structure.

2. The ballistic resistant panel of claim 1, wherein said ballistic resistant panel has a thickness of less than or equal to about 0.24 inches.

3. The ballistic resistant panel of claim 1, wherein said ballistic resistant panel has a real density of less than or equal to about 1.38 lb/ft$^2$.

4. The ballistic resistant panel of claim 1, wherein said ballistic resistant panel has a V50 rating of 1600 ft/sec or greater for a 0.44 Magnum lead bullet having a nominal mass of 15.55 grams and has a V50 rating of 1720 ft/sec or greater for a 9 mm full metal jacketed bullet having a nominal mass of 8.0 grams.

5. The ballistic resistant panel of claim 1, wherein said ballistic resistant panel has a ballistic performance that meets or exceeds level III-A requirements set forth in NIJ Standard 0101.06.

6. The ballistic resistant panel of claim 1, wherein said ballistic resistant panel disposed in said cavity between said outer door structure and said side window of said vehicle door has a bottom edge which seats against a bottom edge of said vehicle door.

7. The ballistic resistant panel of claim 1, further comprising a channel proximate said bottom edge of said vehicle door, wherein said ballistic resistant panel disposed in said cavity between said outer door structure and said side window of said vehicle door seats within said channel.

8. The ballistic resistant panel of claim 1, further comprising a cover disposed over said ballistic resistant panel.

9. The ballistic resistant panel of claim 8, wherein said cover forms a waterproof barrier to prevent moisture from reaching said ballistic resistant panel.

10. The ballistic resistant panel of claim 8, wherein said cover is made from a material selected from the group consisting of: a non-waterproof material, a waterproof material, a chemically-resistant material, a flame-resistant material, a flame-retardant material, or combinations thereof.

11. The ballistic resistant panel of claim 8, further comprising at least one anti-wear strip coupled to a front surface or a back surface of said cover against which a moving part within said vehicle door may contact without breaching said front surface or said back surface of said cover.

12. The ballistic resistant panel of claim 1, wherein said ballistic resistant panel has sufficient flexibility to be contoured around components within said vehicle door.

13. The ballistic resistant panel of claim 1, wherein said ballistic resistant panel includes a stack of ballistic resistant sheets comprising:
   a first plurality of ballistic resistant sheets bonded to each other; and
   a second plurality of ballistic resistant sheets moveable in relation to each other.

14. The ballistic resistant panel of claim 13, wherein said first plurality of ballistic resistant sheets includes a first resin with a first melting temperature, said second plurality of ballistic resistant sheets includes a second resin with a second melting temperature, said second melting temperature higher than said first melting temperature.

15. The ballistic resistant panel of claim 14, wherein upon exposure of said stack to a temperature between said first and second melting temperatures, said first plurality of ballistic resistant sheets bond to each other.

16. The ballistic resistant panel of claim 14, further comprising:
   a third plurality of ballistic resistant sheets including a third resin having a third melting temperature;
   wherein said third melting temperature differs from at least one of said first and second melting temperatures.

\* \* \* \* \*